United States Patent
Kim et al.

(10) Patent No.: US 10,972,686 B2
(45) Date of Patent: Apr. 6, 2021

(54) METHOD FOR RECOGNIZING OBJECT BY USING CAMERA, AND ELECTRONIC DEVICE SUPPORTING SAME

(71) Applicant: Samsung Electronics Co., Ltd., Suwon-si (KR)

(72) Inventors: Dong Soo Kim, Suwon-si (KR); Hwa Yong Kang, Suwon-si (KR); Min Young Park, Seoul (KR); Woon Tahk Sung, Seoul (KR); Young Kwon Yoon, Seoul (KR); Moon Soo Kim, Seoul (KR); Jong Hoon Won, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/485,629

(22) PCT Filed: Feb. 9, 2018

(86) PCT No.: PCT/KR2018/001730
§ 371 (c)(1),
(2) Date: Aug. 13, 2019

(87) PCT Pub. No.: WO2018/151465
PCT Pub. Date: Aug. 23, 2018

(65) Prior Publication Data
US 2019/0364231 A1 Nov. 28, 2019

(30) Foreign Application Priority Data
Feb. 14, 2017 (KR) .................. 10-2017-0020063

(51) Int. Cl.
*H04N 5/341* (2011.01)
*G01J 1/04* (2006.01)
(Continued)

(52) U.S. Cl.
CPC ............ *H04N 5/3415* (2013.01); *G01J 1/044* (2013.01); *H04B 10/502* (2013.01); *H04M 1/72519* (2013.01); *H04N 5/347* (2013.01)

(58) Field of Classification Search
CPC .... H04N 5/3415; H04N 5/347; H04N 5/3532; G01J 1/044; H04B 10/502; H04M 1/72519; H04M 2250/52; H04M 1/22; G06K 9/00
See application file for complete search history.

(56) References Cited

U.S. PATENT DOCUMENTS 6,831,695 B1   12/2004   Tamayama
7,973,825 B2    7/2011   Akiyama
(Continued)

FOREIGN PATENT DOCUMENTS

JP   2001-054009 A   2/2001
JP   2001-069324 A   3/2001
(Continued)

*Primary Examiner* — Yogesh K Aggarwal
(74) *Attorney, Agent, or Firm* — Jefferson IP Law, LLP

(57) ABSTRACT

An electronic device includes a housing including a first surface, a display exposed through a first portion of the first surface, a first light emitting source exposed through a second portion of the first surface, an imaging sensor circuit that is exposed through a third portion of the first surface and is electrically connected with the first light emitting source, and a processor that is disposed in the housing and is electrically connected with the imaging sensor circuit. In addition, various embodiments recognized through the specification are possible.

14 Claims, 16 Drawing Sheets

(51) Int. Cl.
  *H04B 10/50*  (2013.01)
  *H04M 1/725*  (2021.01)
  *H04N 5/347*  (2011.01)

(56) References Cited

U.S. PATENT DOCUMENTS

| | | |
|---|---|---|
| 8,873,584 B2 | 10/2014 | Katibian et al. |
| 10,014,939 B2 | 7/2018 | Cha |
| 2006/0288133 A1 | 12/2006 | Katibian et al. |
| 2008/0303914 A1 | 12/2008 | Akiyama |
| 2014/0163319 A1* | 6/2014 | Blanquart .......... A61B 1/00006 600/109 |
| 2016/0065866 A1* | 3/2016 | Hsu .................... H04N 5/144 348/250 |
| 2016/0248505 A1 | 8/2016 | Cha |

FOREIGN PATENT DOCUMENTS

| | | |
|---|---|---|
| JP | 2004-056257 A | 2/2004 |
| JP | 2008-079136 A | 4/2008 |
| JP | 2008-306423 A | 12/2008 |

\* cited by examiner

METHOD FOR RECOGNIZING OBJECT BY USING CAMERA, AND ELECTRONIC DEVICE SUPPORTING SAME

TECHNICAL FIELD

The disclosure relates to a method for recognizing an object using a camera and an electronic device for supporting the same.

BACKGROUND ART

An electronic device, such as a smartphone or a tablet PC, may perform various functions, such as video playback, web search, and shopping. Furthermore, the electronic device may perform functions, such as banking and payment, performed by user authentication. Technology such as a password input or a fingerprint input is used as a user authentication technology. Recently, a scheme which recognizes an iris of a user is used as a user authentication technology. The user may execute a function, such as banking or payment, in the electronic device using information about a living body, such as a fingerprint or an iris.

For iris recognition technology, the electronic device radiates an infrared light to eyes of the user and uses light reflected from the eyes of the user. For example, the electronic device may output a light of a specified wavelength to the outside using a light output device such as an infrared (IR) LED. The electronic device may receive light reflected from the eyes of the user through its image sensor and may collect iris data.

DISCLOSURE

Technical Problem

In an electronic device according to an existing technology, due to an exposure time in its image sensor and a time difference between infrared (IR) pulses, there may be a high probability that noise according to an external light will occur.

Furthermore, in the electronic device according to the existing technology, due to a shutter operation of the image sensor, a signal difference may occur for each row of the image sensor. In the electronic device, a shading phenomenon in which image data is lost may occur in data adjacent to a row which is finally read out.

Furthermore, in the electronic device according to the existing technology, when a duration of an output infrared ray is increased to reduce the shading phenomenon, because power loss is increased and because excessive stimuli are provided to eyes of a user upon iris recognition, safety problems may occur.

Technical Solution

Various embodiments of the disclosure are to provide an object recognition method for recognizing an iris of a user and an electronic device for supporting the same.

In accordance with an aspect of the disclosure, an electronic device is provided. The electronic device may include a housing including a first surface, a display exposed through a first portion of the first surface, a first light emitting source exposed through a second portion of the first surface, an imaging sensor circuit that is exposed through a third portion of the first surface and is electrically connected with the first light emitting source, and a processor that is disposed in the housing and is electrically connected with the imaging sensor circuit. The imaging sensor circuit may be configured to receive an enable signal from the processor, perform readout from a first time t1 to a second time t2 depending on the reception of the enable signal, and provide a first synchronization signal to the first light emitting source from a third time t3 to a fourth time t4 and from a fifth time t5 to a sixth time t6. The first to sixth times t1 to t6 may have a relationship of the third time t3<the fourth time t4≤the first time t1<the fifth time t5<the sixth time t6≤the second time t2.

Advantageous Effects

The object recognition method and the electronic device for supporting the same according to various embodiments of the disclosure may reduce an exposure time of an image sensor to reduce an influence by an external light source in a process of recognizing an object (e.g., an iris).

The object recognition method and the electronic device for supporting the same according to various embodiments of the disclosure may enhance an iris recognition rate using a plurality of infrared pulses in a process of collecting image data for one frame.

The object recognition method and the electronic device for supporting the same according to various embodiments of the disclosure may reduce stimuli to eyes of a user using the plurality of infrared pulses and may reduce power consumption.

MODE FOR INVENTION

Figure 1:
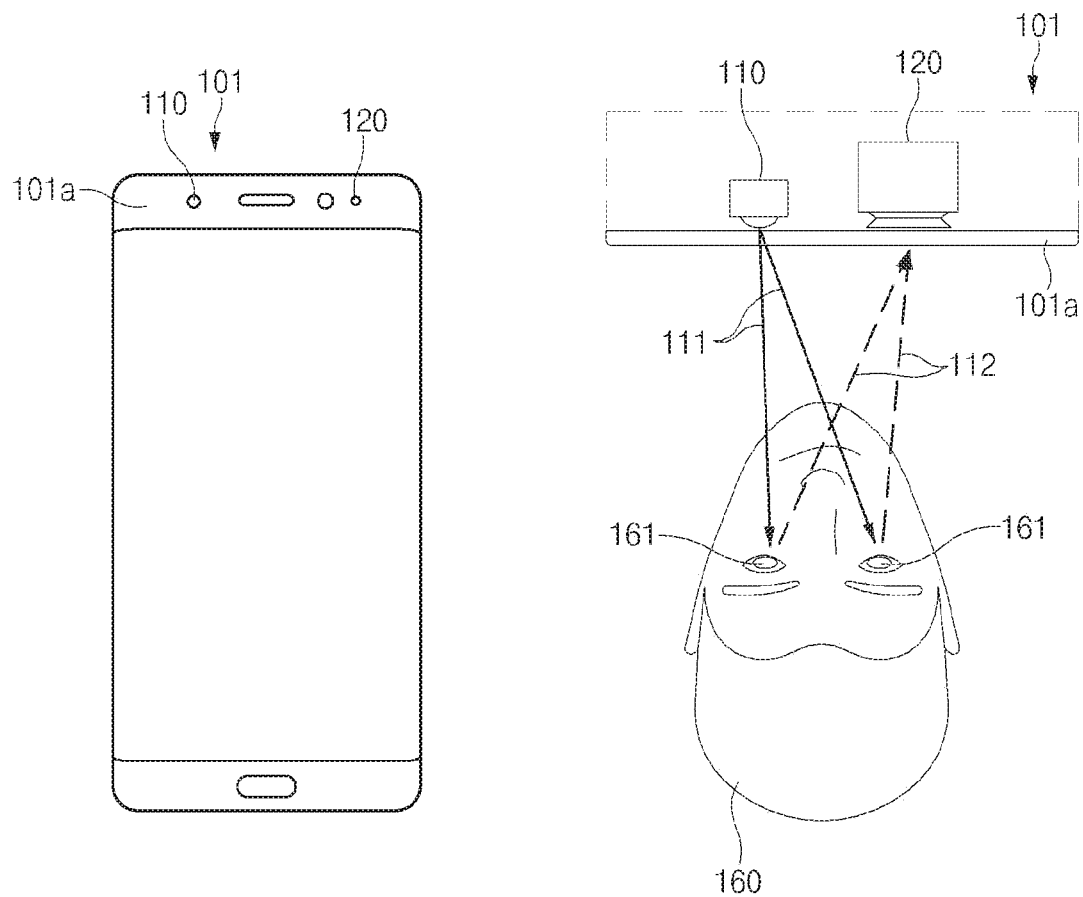
FIG. 1 is a drawing illustrating a configuration of an electronic device according to various embodiments.

Hereinafter, various embodiments of the present disclosure will be described with reference to the accompanying drawings. Accordingly, those of ordinary skill in the art will recognize that modification, equivalent, and/or alternative on the various embodiments described herein can be variously made without departing from the scope and spirit of the present disclosure. With regard to description of drawings, similar components may be marked by similar reference numerals.

In the disclosure disclosed herein, the expressions "have", "may have", "include" and "comprise", or "may include" and "may comprise" used herein indicate existence of corresponding features (for example, elements such as numeric values, functions, operations, or components) but do not exclude presence of additional features.

In the disclosure disclosed herein, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used herein may refer to various elements of various embodiments of the present disclosure, but do not limit the elements. For example, such terms are used only to distinguish an element from another element and do not limit the order and/or priority of the elements. For example, a first user device and a second user device may represent different user devices irrespective of sequence or importance. For example, without departing the scope of the present disclosure, a first element may be referred to as a second element, and similarly, a second element may be referred to as a first element.

It will be understood that when an element (for example, a first element) is referred to as being "(operatively or communicatively) coupled with/to" or "connected to" another element (for example, a second element), it can be directly coupled with/to or connected to the other element or an intervening element (for example, a third element) may be present. In contrast, when an element (for example, a first element) is referred to as being "directly coupled with/to" or "directly connected to" another element (for example, a second element), it should be understood that there are no intervening element (for example, a third element).

According to the situation, the expression "configured to" used herein may be used as, for example, the expression "suitable for", "having the capacity to", "designed to", "adapted to", "made to", or "capable of". The term "configured to (or set to)" must not mean only "specifically designed to" in hardware. Instead, the expression "a device configured to" may mean that the device is "capable of" operating together with another device or other components. CPU, for example, a "processor configured to (or set to) perform A, B, and C" may mean a dedicated processor (for example, an embedded processor) for performing a corresponding operation or a generic-purpose processor (for example, a central processing unit (CPU) or an application processor) which may perform corresponding operations by executing one or more software programs which are stored in a memory device.

Terms used in this specification are used to describe specified embodiments of the present disclosure and are not intended to limit the scope of the present disclosure. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the present disclosure. In some cases, even if terms are terms which are defined in the specification, they may not be interpreted to exclude embodiments of the present disclosure.

An electronic device according to various embodiments of the present disclosure may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), MP3 players, mobile medical devices, cameras, and wearable devices. According to various embodiments of the present disclosure, the wearable devices may include accessories (for example, watches, rings, bracelets, ankle bracelets, glasses, contact lenses, or head-mounted devices (HMDs)), cloth-integrated types (for example, electronic clothes), body-attached types (for example, skin pads or tattoos), or implantable types (for example, implantable circuits).

In some embodiments of the present disclosure, the electronic device may be one of home appliances. The home appliances may include, for example, at least one of a digital video disk (DVD) player, an audio, a refrigerator, an air conditioner, a cleaner, an oven, a microwave oven, a washing machine, an air cleaner, a set-top box, a home automation control panel, a security control panel, a TV box (for example, Samsung HomeSync™, Apple TV™, or Google TV™), a game console (for example, Xbox™ or PlayStation™), an electronic dictionary, an electronic key, a camcorder, or an electronic panel.

In another embodiment of the present disclosure, the electronic device may include at least one of various medical devices (for example, various portable medical measurement devices (a blood glucose meter, a heart rate measuring device, a blood pressure measuring device, and a body temperature measuring device), a magnetic resonance angiography (MRA), a magnetic resonance imaging (MRI) device, a computed tomography (CT) device, a photographing device, and an ultrasonic device), a navigation system, a global navigation satellite system (GNSS), an event data recorder (EDR), a flight data recorder (FDR), a vehicular infotainment device, electronic devices for vessels (for example, a navigation device for vessels and a gyro compass), avionics, a security device, a vehicular head unit, an industrial or home robot, an automatic teller's machine (ATM) of a financial company, a point of sales (POS) of a store, or an internet of things (for example, a bulb, various sensors, an electricity or gas meter, a spring cooler device, a fire alarm device, a thermostat, an electric pole, a toaster, a sporting apparatus, a hot water tank, a heater, and a boiler).

According to some embodiments of the present disclosure, the electronic device may include at least one of a furniture or a part of a building/structure, an electronic board, an electronic signature receiving device, a projector, or various measurement devices (for example, a water service, electricity, gas, or electric wave measuring device). In various embodiments of the present disclosure, the electronic device may be one or a combination of the aforementioned devices. The electronic device according to some embodiments of the present disclosure may be a flexible electronic device. Further, the electronic device according to an embodiment of the present disclosure is not limited to the aforementioned devices, but may include new electronic devices produced due to the development of technologies.

Hereinafter, electronic devices according to an embodiment of the present disclosure will be described with reference to the accompanying drawings. The term "user" used herein may refer to a person who uses an electronic device or may refer to a device (for example, an artificial electronic device) that uses an electronic device.

FIG. 1 is a drawing illustrating a configuration of an electronic device according to various embodiments. In FIG. 1, an embodiment is exemplified as irises of a user are recognized. However, embodiments are not limited thereto. The electronic device may recognize various external objects.

Referring to FIG. 1, an electronic device 101 may recognize irises 161 of a user 160. The electronic device 101 may radiate light to the irises 161 of the user 160 and may correct image data using light reflected from the irises 161. The electronic device 101 may perform an authentication process of the user 160 using the collected image data. When the authentication of the user 160 is completed, the electronic device 101 may perform various functions, for example, screen-off, unlocking, payment, or the like.

According to various embodiments, the electronic device 101 may mount a light output unit 110 and a camera 120 for recognizing the irises 161 on a first surface of a housing 101a (e.g., a surface where a display is mounted).

According to an embodiment, the light output unit 110 (e.g., an infrared (IR) LED, a flash, or the like) may output a light 111 of a specified wavelength to the outside. The light 111 output from the light output unit 110 may be radiated to the irises 161 of the user 160. A reflected light 112 may be incident to an image sensor (an imaging sensor circuit) (not shown) in the camera 120.

According to various embodiments, the light output unit 110 may output the light 111 of multiple pulses depending on a control signal generated by the image sensor. For example, the light 111 of the multiple pulses may include a first pulse and a second pulse, each of which has the same duration. The first pulse and the second pulse may be radiated to the irises 161 at a specified time interval. For another example, the light 111 of the multiple pulses may include a first pulse and a second pulse, each of which has a different duration. The first pulse and the second pulse may be radiated to the irises 161 at the specified time interval.

According to various embodiments, the light output unit 110 may include a first light emitting source which outputs a light of an infrared region and a second light emitting source which outputs a light of a red visible region. Light output from the first light emitting source and the second light emitting source may be output through the same window or different windows.

According to an embodiment, the camera 120 may collect the reflected light 112. The collected light may be incident to the image sensor in the camera 120 and may be converted into electronic image data by an optical/electrical conversion effect. Pixels included in the image sensor may be read out in a specified order. Image data collected through the readout may be provided to a processor in the electronic device 101. The image data may be used in a user authentication process. Additional information about an operation of the image sensor may be provided with reference to FIGS. 2 to 8.

Figure 2:
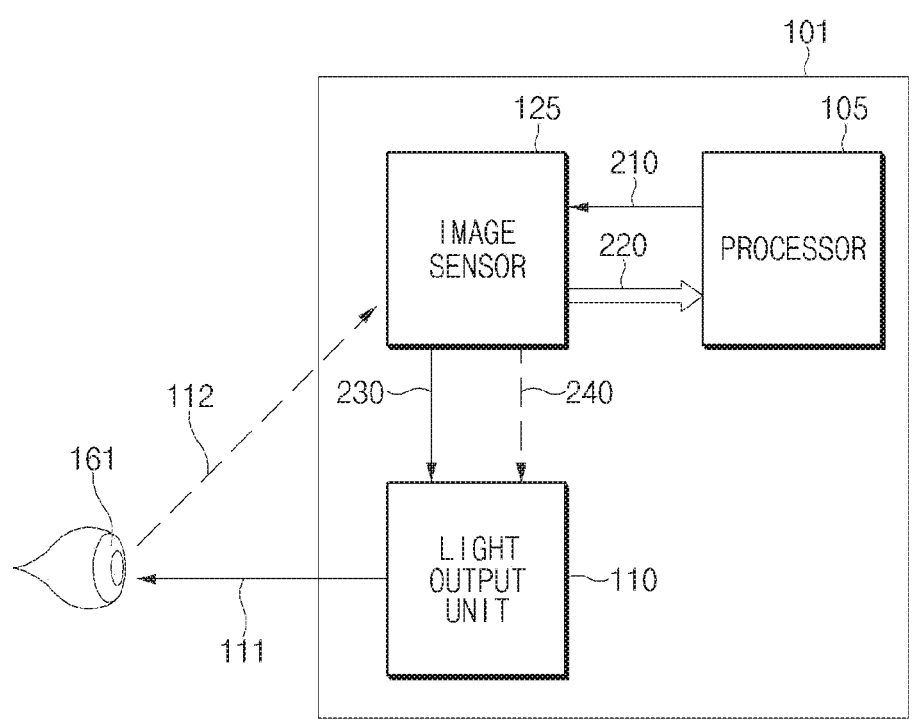
FIG. 2 is a drawing illustrating a configuration of an electronic device according to various embodiments.

FIG. 2 is a drawing illustrating a configuration of an electronic device according to various embodiments. FIG. 2 illustrates an electronic device 101 (e.g., an electronic device 101 of FIG. 1) about, but not limited to, a configuration associated with iris recognition.

Referring to FIG. 2, the electronic device 101 may include a processor 105, a light output unit 110, and an image sensor 125.

According to various embodiments, the processor 105 may control the image sensor 125. The processor 105 may transmit a control signal to the image sensor 125 over a control channel (e.g., an inter integrated circuit (I2C)) 210. The control signal may include information about an operation (e.g., turn-on, turn-off, an operation speed, readout timing, or shutter timing, or the like) of the image sensor 125. For example, the control signal may include information about a speed (e.g., frame per second (fps)) at which image data is collected in the image sensor 125. The image sensor 125 may adjust a speed at which all pixels are read out once, an exposure time, or the like depending on the control signal.

According to various embodiments, the processor 105 may receive image data collected by the image sensor 125, over a data channel (e.g., an MIPI) 220. The processor 105 may perform a user authentication operation based on the received image data. The processor 105 may newly register (store) information about an iris of a user (in a memory) based on the image data received from the image sensor 125, or may compare previously stored iris information with the received image data to determine whether the iris information is identical to the image data. For example, when a rate at which the stored authentication information is identical to the received image data is greater than or equal to a specified value, the processor 105 may unlock a screen or may execute a specified function (e.g., payment, remittance, or the like) of an app.

According to various embodiments, the image sensor 125 (or an imaging sensor circuit, an imaging device, or an imaging device unit) may convert light into electronic image data using an optical/electrical conversion effect. The image sensor 125 may include two-dimensionally allocated pixel groups. Each pixel may convert light into electronic image data. The image sensor 125 may read out electronic image data according to the optical/electrical conversion effect, recorded in each pixel.

According to various embodiments, the image sensor 125 may read out pixels of a first row among all pixels and may sequentially read out pixels of a next row. When all the pixels of the image sensor 125 are read out once, image data about one frame (hereinafter, frame data) may be collected.

According to various embodiments, the image sensor 125 may operate at a specified operation speed (e.g., frame per second (fps)) depending on an enable signal received from the processor 105. The processor 105 may provide information (e.g., fps) about an operation speed of the image sensor 125 to the image sensor 125 through the enable signal. The image sensor 125 may perform readout based on information about an operation speed included in the enable signal. For example, when operating at 30 fps, the image sensor 125 may collect one frame data every 33 ms. For another example, when operating at 15 fps, the image sensor 125 may collect one frame data every 66 ms.

According to various embodiments, the image sensor 125 may reset a value recorded in a pixel to implement an electronic shutter. The image sensor 125 may proceed with a shutter reset process after pixels are read out and may collect image data of a next frame.

After the shouter reset process, the image sensor 125 may allow pixels to enter an exposure state where the pixels receive an external light during a specified time. In the exposure state, the optical/electrical conversion effect may occur in pixels through light incident from the outside. The light incident from the outside may include light which occurs from an external light source (e.g., a lighting device, the sun, or the like) as well as the light output unit 110. When an exposure time becomes long in the image sensor 125, an amount of noise (light incident from the external light source) may be relatively increased and an iris recognition rate may be degraded.

According to various embodiments, the image sensor 125 may have one or more channels for controlling the light output unit 110. In FIG. 2, an embodiment is exemplified as the image sensor 125 transmits the control signal to the light output unit 110 using a first control channel (e.g., GPIO) 230 or a second control channel (e.g., GPIO) 240. However, embodiments are not limited thereto.

According to various embodiments, the first control channel 230 may deliver a first control signal (or a first synchronization signal) (e.g., an infrared pulse generation signal) to emit a light of an infrared pulse for recognizing the iris 161. The first control signal may be transmitted over the first control channel 230. For example, the image sensor 125 may transmit the first control signal (e.g., the pulse generation signal) to the light output unit 110 such that a two-time pulse is generated while one frame data is collected. According to an embodiment, the first control signal may be configured to be linked to a readout start or end time of the image sensor 125.

According to various embodiments, the first control signal (the pulse generation signal) may control such that the light output unit 110 outputs a light 111 of double pulses. The light 111 of the double pulses may include a first pulse and a second pulse, each of which has the same duration. The first control signal may include a first pulse generation signal for outputting the first pulse and a second pulse generation signal for outputting the second pulse.

According to various embodiments, the second control channel 240 may deliver a second control signal (or a second synchronization signal) (e.g., a red pulse generation signal) for controlling to emit light of a sub-pulse for removing or reducing blinking of the light output unit 110 between frames. The second control signal may be transmitted over the second control channel 240. For example, when the first control signal is periodically transmitted to the light output unit 110, the image sensor 125 may transmit a second control signal between first control signals. Additional information about the second control signal may be provided with reference to FIGS. 6 and 8.

According to various embodiments, the first control channel 230 and the second control channel 240 may be different channels which are physically classified.

According to various embodiments, the light output unit 110 may output the light 111 of the specified wavelength to the outside. The light 111 output from the light output unit 110 may be radiated to the iris 161 of the user 160. A reflected light 112 may be incident to the image sensor 125.

According to various embodiments, the light output unit 110 may output the light 111 of the infrared wavelength depending on the first control signal (transmitted over the first control channel 230) generated by the image sensor 125. The light output unit 110 may output a light of a red wavelength depending on the second control signal (transmitted over the second control channel 240) generated by the image sensor 125. The light of the red wavelength may be output between infrared lights for iris recognition to prevent or reduce blinking of the light output unit 110. As a result, inconvenience of a user due to blinking of the light output unit 110 in the process of recognizing the iris 161 may be reduced.

In FIG. 2, an embodiment is exemplified as the light output unit 110 operates by the control signal of the image sensor 125. However, embodiments are not limited thereto. For example, the light output unit 110 may be controlled by another element such as the processor 105.

Figure 3:
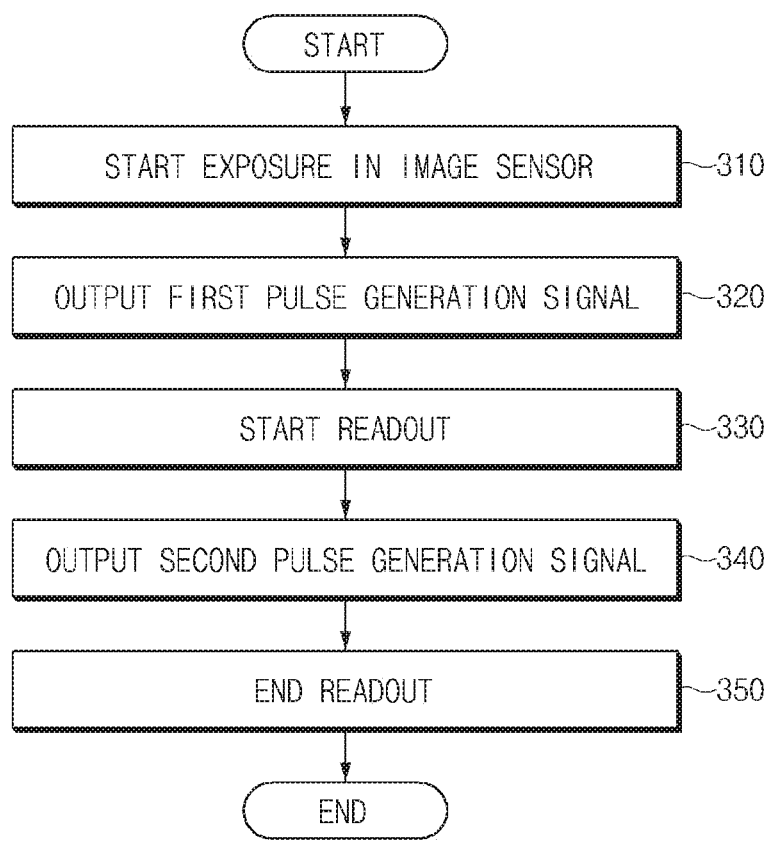
FIG. 3 is a flowchart illustrating an object recognition method of an electronic device according to various embodiments.

FIG. 3 is a flowchart illustrating an object recognition method of an electronic device according to various embodiments. FIG. 3 illustrates a process where an electronic device collects image data corresponding to one frame.

Referring to FIG. 3, in operation 310, an image sensor 125 of an electronic device (e.g., an electronic device 101 of FIG. 1 or an electronic device 101 of FIG. 2) may start an exposure such that an optical/electrical conversion effect occurs by an external light. Image data may be collected in each pixel by light incident from the outside during an exposure time. The light incident from the outside may include light which occurs from an external light source (e.g., a lighting device, the sun, or the like) as well as the light output unit 110.

According to various embodiments, when a user authentication process for iris authentication is started, a processor 105 may reset the image sensor 125 and the light output unit 110. For example, the processor 105 may transmit a signal for controlling to reset each pixel to the image sensor 125. The processor 105 may supply power such that the light output unit 110 outputs a pulse.

In operation 320, the image sensor 125 may transmit a first pulse generation signal to the light output unit 110. According to the first pulse generation signal, the light output unit 110 may output a light of a first pulse. The first pulse may be an infrared ray which is ended after lasting for a specified time (e.g., 10 ms).

According to various embodiments, after readout of a previous frame is ended, the image sensor 125 may transmit the first pulse generation signal to the light output unit 110.

According to various embodiments, the image sensor 125 may transmit the first pulse generation signal before a specified time from a time when readout of a first row is started.

According to various embodiments, at the time when the readout of the first row is started or before the readout of the first row is started, the image sensor 125 may transmit the first pulse generation signal such that the first pulse is ended.

In operation 330, the image sensor 125 may start readout. According to an embodiment, the image sensor 125 may start readout from a first row of a plurality of pixels. Pixels of other rows before readout may continue to be exposed, and an optical/electrical conversion effect may continue by light incident from the outside.

In operation 340, the image sensor 125 may output a second pulse generation signal for outputting a second pulse while the readout is in progress. According to the second pulse generation signal, the light output unit 110 may output a light of the second pulse. For example, the second pulse may be an infrared ray which is ended after lasting for the specified time (e.g., 10 ms).

According to various embodiments, the image sensor 125 may generate the second pulse generation signal such that the second pulse is output after readout of a first row proceeds.

According to various embodiments, the image sensor 125 may generate the second pulse generation signal based on readout timing of a last row. For example, the image sensor 125 may generate the second pulse generation signal, such that readout is ended after the second pulse is ended or such that readout is ended at the same time that the second pulse is ended.

In operation 350, the image sensor 125 may end the readout process. The image sensor 125 may read out a last row of the plurality of pixels and may transfer the read-out image data to the processor 105. The image sensor 125 may transmit image data of a row to the processor 105 or may transmit the image data of the row at intervals of one frame data.

According to various embodiments, the image sensor 125 may repeat operations 310 to 350 by the number of a plurality of frames to collect image data corresponding to the plurality of frames. The collected image data may be provided to the processor 105 to be used for user authentication. The image sensor 125 may transmit a first control signal such that a pulse is output at least two times from the light output unit 110 in a process of collecting frame data.

According to various embodiments, in FIG. 3, an embodiment is exemplified as the light output unit 110 operates by the control signal of the image sensor 125. However, embodiments are not limited thereto. For example, the light output unit 110 may be controlled directly by a control signal generated by the processor 105 in FIG. 2.

Figure 4A:
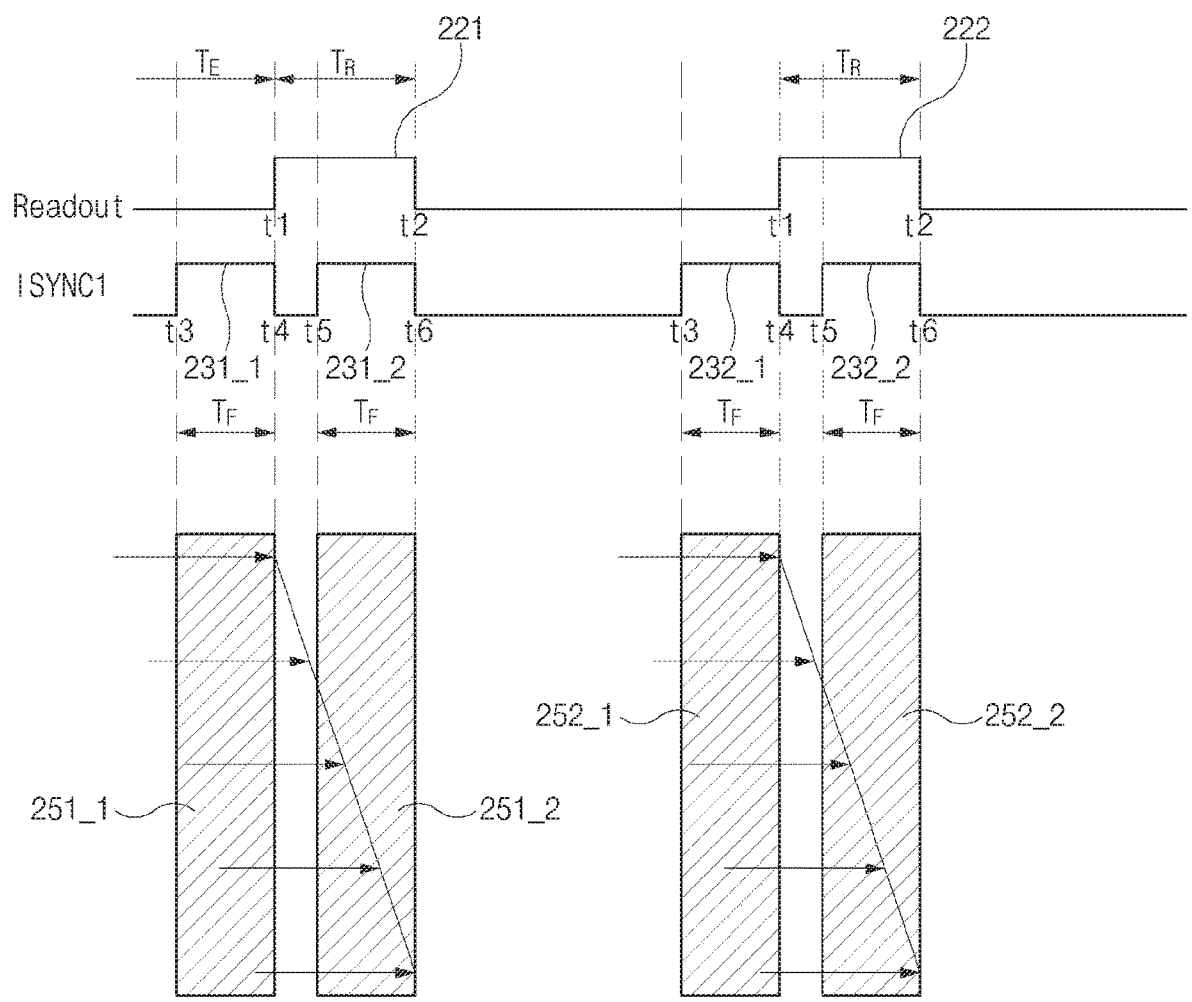
FIG. 4A is a timing diagram according to various embodiments.

FIG. 4A is a timing diagram according to various embodiments. FIG. 4A is illustrative, and it is not limited thereto.

Referring to FIG. 4A, a processor 105 of an electronic device (e.g., an electronic device 101 of FIG. 1 or an electronic device 101 of FIG. 2) may determine an operation speed of an image sensor 125. For example, the processor 105 may transmit a control signal such that the image sensor 125 operates at specified frame per second (e.g., 15 fps, 30 fps, 60 fps, or the like).

According to various embodiments, the image sensor 125 may collect frame data at a specified operation speed. The image sensor 125 may reset pixels, may maintain the pixels in an exposed state, and may read out the pixels in a specified order to collect frame data. In an embodiment, the image sensor 125 may allow pixels included in each row to operate according to the same timing signal. For example, pixels included in the same row may enter a reset state and an exposure state in the same manner and may be read out at the same time.

According to various embodiments, in each pixel constituting the image sensor 125, an end time of an exposure time $T_E$ may be identical to a start time of a readout time $T_R$.

According to various embodiments, during the exposure time $T_E$, an optical/electrical conversion effect may occur in pixels by light incident from the outside. The light incident from the outside may include light which occurs from an external light source (e.g., a lighting device, the sun, or the like) as well as a light output unit 110.

According to various embodiments, time $T_R$ 221 or 222 taken to read out all pixels once may change according to a control signal transmitted from the processor 105. For example, for 30 fps, the image sensor 125 may set time $T_R$ taken to perform readout once to 33 ms or less.

According to various embodiments, the image sensor 125 may determine output timing of a first pulse generation signal 231_1 or 232_1 on the basis of a start time t1 of readout. For example, before readout of a first row is started, the first pulse generation signal 231_1 or 232_1 may be generated and ended in the exposure time $T_E$(t3<t4<t1). For another example, an end time of the first pulse generation signal 231_1 or 232_1 may be set to be the same as a time when the readout of the first row is started (t4=t1).

According to various embodiments, the image sensor 125 may determine output timing of a second pulse generation signal 231_2 or 232_2 on the basis of the start time t1 of the readout and an end time t2 of the readout. For example, the second pulse generation signal 231_2 or 232_2 may be generated after the start time t1 of the readout and may be ended before the end time t2 of the readout (t1<t5<t6<t2). For another example, an end time of the second pulse generation signal 231_2 or 232_2 may be set to be the same as a time when readout of a last row is ended (t6=t2).

According to various embodiments, a pulse duration $T_F$ may vary according to a characteristic of the image sensor 125, a characteristic of a light output unit 110, or the like. According to an embodiment, the pulse duration $T_F$ may be set to be shorter than the readout time $T_R$ 221 or 222.

According to various embodiments, a first pulse 251_1 or 251_2 may be output by the first pulse generation signal 231_1 or 232_1. The first pulse 251_1 or 252_1 may be ended before readout of the image sensor 125 is started.

According to various embodiments, a second pulse 251_2 or 252_2 may be output by the second pulse generation signal 231_2 or 232_2. The second pulse 251_2 or 252_2 may be ended before readout of a last row of the image sensor 125 is started.

According to various embodiments, in each pixel constituting the image sensor 125, an optical/electrical conversion effect may occur by the first pulse 251_1 or 252_1 or the second pulse 251_2 or 252_2. In pixels of a first row of the image sensor 125, the optical/electrical conversion effect may occur by the first pulse 251_1 or 252_1 introduced after reset. In pixels of a last row of the image sensor 125, the optical/electrical conversion effect may occur by the first pulse 251_1 or 252_1 and the second pulse 251_2 or 252_2, which are introduced after reset.

Figure 4B:
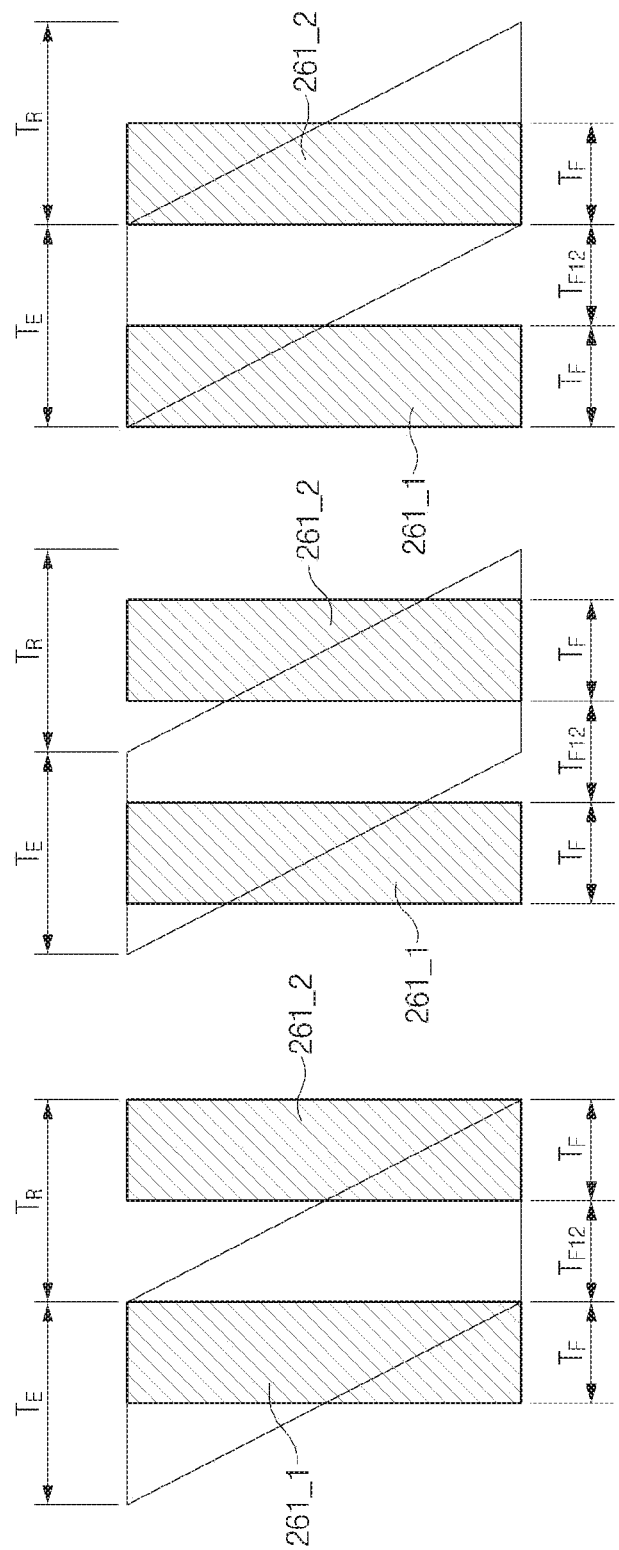
FIG. 4B illustrates outputs of a first pulse and a second pulse when an exposure time and a readout time are the same as each other according to various embodiments.

FIG. 4B illustrates outputs of a first pulse and a second pulse when an exposure time and a readout time are the same as each other according to various embodiments. FIG. 4B is illustrative, and it is not limited thereto.

Referring to FIG. 4B, a processor 105 of an electronic device (e.g., an electronic device 101 of FIG. 1 or an electronic device 101 of FIG. 2) may determine an operation speed of an image sensor 125. For example, the processor 105 may transmit a control signal such that the image sensor 125 operates at specified frame per second (e.g., 15 fps, 30 fps, 60 fps, or the like).

According to various embodiments, the processor 105 may set an exposure time $T_E$ before readout of the image sensor 125 is started and a time $T_R$ when substantially all pixels of the image sensor 125 are read out once to be identical to each other.

The image sensor 125 according to various embodiments may transmit a first control signal to a light output unit 110 such that a first pulse 261_1 and a second pulse 261_2, each of which has a specified duration $T_F$ (e.g., 10 ms), are output. The first pulse 261_1 may be generated and ended, for example, before readout is started in the image sensor 125. The second pulse 261_2 may be ended, for example, before the readout time $T_R$ is ended.

According to various embodiments, the processor 105 may change a generation time in the state where the first pulse 261_1 and the second pulse 261_2 have the same duration $T_F$ and maintain a time difference $T_{F12}$. For example, the processor 105 may add the pulse duration $T_F$ to the time difference $T_{F12}$ to set to be the same or shorter than the exposure time $T_E$ (=the readout time $T_R$). For example, the first pulse 261_1 may be started after an exposure time $T_E$ of a first row of the image sensor 125 is started and may be ended before the exposure time $T_E$ of the first row is ended. The second pulse 261_2 may be started after an exposure time $T_E$ of a last row of the image sensor 125 is started and may be ended before readout of the last row is started.

Figure 4C:
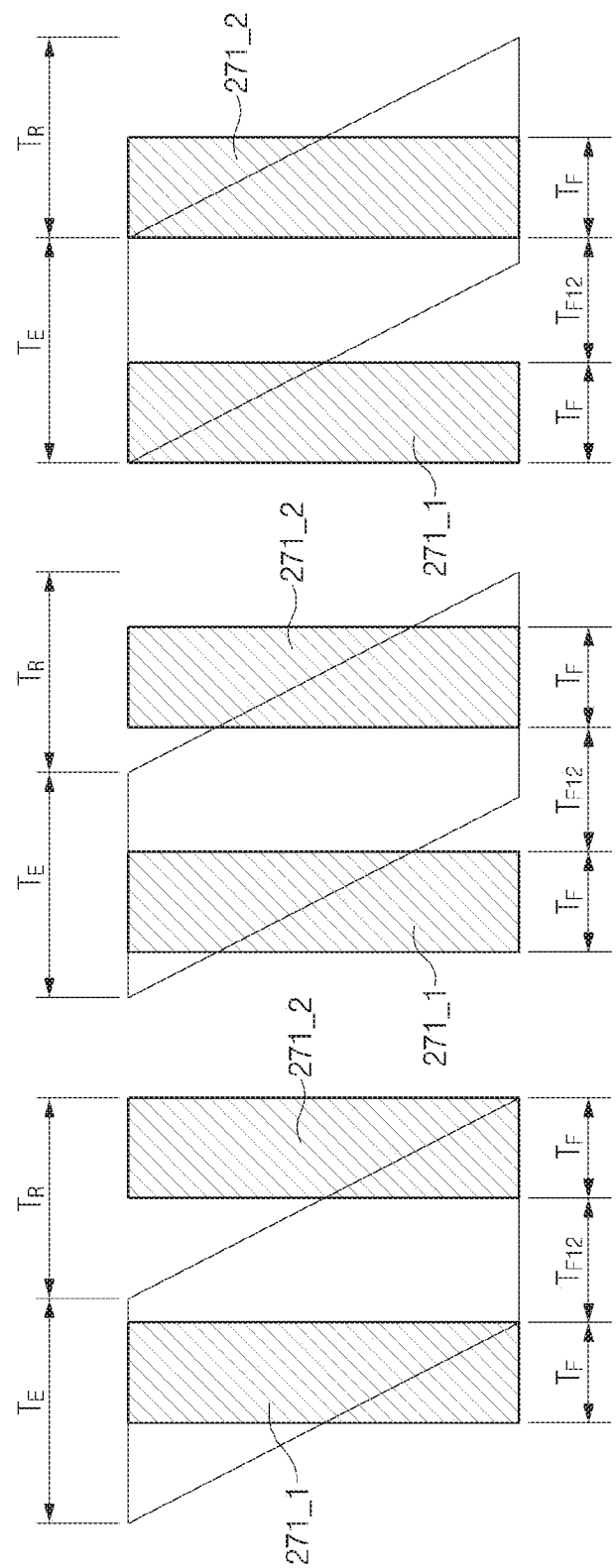
FIG. 4C illustrates outputs of a first pulse and a second pulse when an exposure time is longer than a readout time according to various embodiments.

FIG. 4C illustrates outputs of a first pulse and a second pulse when an exposure time is longer than a readout time according to various embodiments. FIG. 4C is illustrative, and it is not limited thereto.

Referring to FIG. 4C, according to various embodiments, a processor 105 may set an exposure time $T_E$ before readout of an image sensor 125 is started to be longer than a time $T_R$ taken to read out substantially all pixels of the image sensor 125 once.

The image sensor 125 according to various embodiments may transmit a first control signal to a light output unit 110 such that a first pulse 271_1 and a second pulse 271_2, each of which has a specified duration $T_F$ (e.g., 10 ms), are output. The first pulse 271_1 may be generated and ended, for example, before readout is started in the image sensor 125. The second pulse 271_2 may be ended, for example, before the readout time $T_R$ is ended.

According to various embodiments, the processor 105 may change a generation time in the state where the first pulse 271_1 and the second pulse 271_2 have the same duration $T_F$ and maintain a time difference $T_{F12}$. For example, the processor 105 may add the pulse duration $T_F$ to the time difference $T_{F12}$ to set to be the same or shorter than the exposure time $T_E$. The time difference $T_{F12}$ may be longer than a time difference $T_{F12}$ in FIG. 4B by a difference $(T_E-T_R)$ between the exposure time $T_E$ and the readout time $T_R$. For example, the first pulse 271_1 may be started after an exposure time $T_E$ of a first row of the image sensor 125 is started and may be ended before the exposure time $T_E$ of the first row is ended. The second pulse 271_2 may be started after an exposure time $T_E$ of a last row of the image sensor 125 is started and may be ended before readout of the last row is started.

Figure 4D:
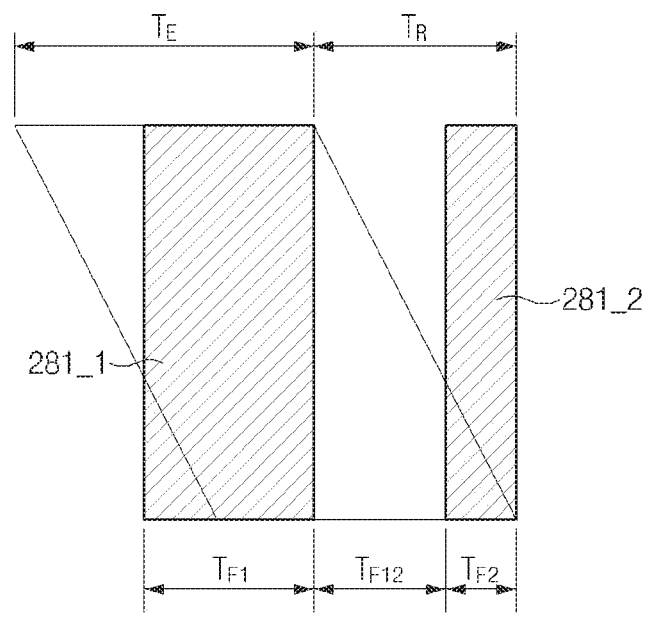
FIG. 4D illustrates an output when durations of a first pulse and a second pulse differ from each other according to various embodiments.

FIG. 4D illustrates an output when durations of a first pulse and a second pulse differ from each other according to various embodiments. FIG. 4D is illustrative, and it is not limited thereto.

Referring to FIG. 4D, according to various embodiments, a processor 105 may set an exposure time $T_E$ before readout of a row is started to be longer than a time $T_R$ taken to read out substantially all pixels of an image sensor 125 once.

The image sensor 125 according to various embodiments may transmit a first control signal to a light output unit 110 such that a first pulse 281_1 having a first duration $T_{F1}$ (e.g., 15 ms) and a second pulse 281_2 having a second duration $T_{F2}$ (e.g., 8 ms) are output. The first pulse 281_1 may be generated and ended, for example, before readout is started in the image sensor 125. The second pulse 281_2 may be ended, for example, before the readout time $T_R$ is ended.

According to various embodiments, the processor 105 may change a generation time in the state where the first pulse 281_1 and the second pulse 281_2 have the different durations $T_{F1}$ and $T_{F2}$ and maintain a time difference $T_{F12}$. For example, the processor 105 may add the first pulse duration $T_{F1}$ to the time difference $T_{F12}$ to set to be the same or shorter than the exposure time $T_E$. Furthermore, the processor 105 may add the second pulse duration $T_{F2}$ to the time difference $T_{F12}$ to set to be the same or shorter than the readout time $T_R$. For example, the first pulse 281_1 may be started after an exposure time $T_E$ of a first row of the image sensor 125 is started and may be ended before the exposure time $T_E$ of the first row is ended. The second pulse 281_2 may be started after the exposure time $T_E$ of a last row of the image sensor 125 is started and may be ended before readout of the last row is started.

According to various embodiments, in FIGS. 4B to 4D, the processor 105 may set such that light provided through the first pulse 261_1, 271_1, or 281_1 and the second pulse 261_2, 271_2, or 281_2 is introduced into each pixel constituting the image sensor 105 during the same time. For example, the processor 105 may adjust an exposure time and a readout time of each pixel, durations of the first pulse and the second pulse, or an interval between the first pulse and the second pulse to control such that the amount of infrared rays provided to each pixel maintains an equal level.

Figure 5A:
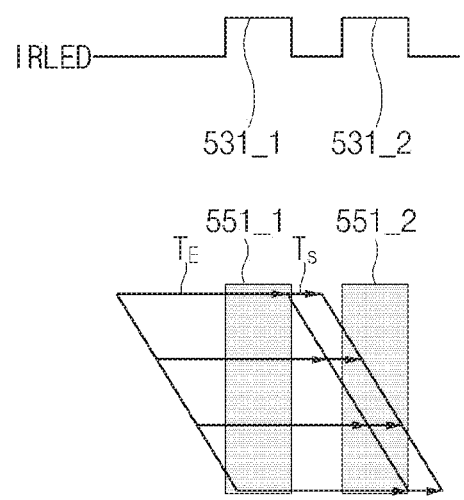
FIGS. 5A, 5B, and 5C are drawings illustrating a change in output forms of a first pulse and a second pulse according to various embodiments.
Figure 5B:
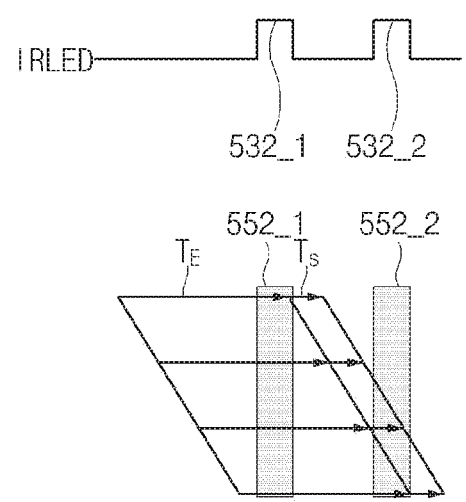
Figure 5C:
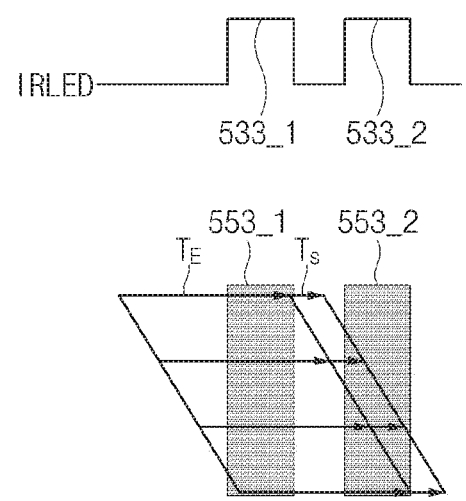

FIGS. 5A to 5C are drawings illustrating a change in output forms of a first pulse and a second pulse according to various embodiments.

Referring to FIGS. 5A to 5C, a processor 105 (or an image sensor 125) of an electronic device (e.g., an electronic device 101 of FIG. 1 or an electronic device 101 of FIG. 2) may change output forms of a first pulse and a second pulse depending on an environment (e.g., illumination, whether there is a separate light source, a distance from a user, or the like) around the electronic device 101, a state of an electronic device 101 (e.g., an operation state of a processor, a state of a battery, or the like), a characteristic of the image sensor 125, a characteristic of a light output unit 110, or the like.

In FIG. 5A, the image sensor 125 according to various embodiments may transmit a first control signal to the light output unit 110 such that a first pulse 551_1 and a second pulse 551_2, each of which has a specified duration (e.g., 10 ms), are output. The first pulse 551_1 may be generated and ended, for example, before readout is started in the image sensor 125. The second pulse 551_2 may be generated, for example, while readout is in progress and may be ended before the readout is ended. A shutter time Ts may proceed after readout proceeds in each pixel. During the shutter time Ts, image data recorded in each pixel may be reset.

In FIG. 5B, the processor 105 may detect an environment around the electronic device 101 and may control the image sensor 125 to change durations of the first pulse 551_1 and the second pulse 551_2. For example, when the user is within a specified distance from the electronic device 101, the processor 105 may set durations of a first pulse 552_1 and a second pulse 552_2 to be relatively shorter than those in FIG. 5A. For another example, when there is a little influence of an ambient light source, the processor 105 may set the durations of the first pulse 552_1 and the second pulse 552_2 to be relatively shorter than those in FIG. 5A.

In FIG. 5C, the processor 105 may detect an environment around the electronic device 101 and may control the image sensor 125 to change intensity of the first pulse 551_1 and the second pulse 551_2. For example, when the user is out of a specified distance from the electronic device 101, the processor 105 may set the intensity of the first pulse 551_1 and the second pulse 551_2 to be relatively stronger than that in FIG. 5A. For example, when there is much influence of an ambient light source, the processor 105 may set the intensity of the first pulse 551_1 and the second pulse 551_2 to be relatively stronger than that in FIG. 5A.

Figure 6:
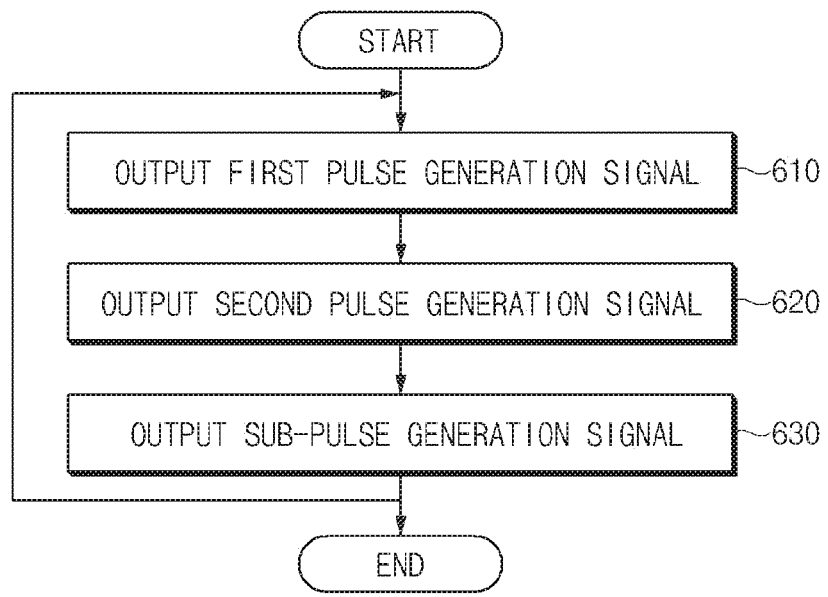
FIG. 6 is a flowchart illustrating an output of a sub-pulse signal according to various embodiments.

FIG. 6 is a flowchart illustrating an output of a sub-pulse signal according to various embodiments.

Referring to FIG. 6, an image sensor 125 of an electronic device (e.g., an electronic device 101 of FIG. 1 or an electronic device 101 of FIG. 2) may allow a sub-pulse (e.g., a red light) to be output by a second control signal after a first pulse and a second pulse (infrared light) are output by a first control signal. The sub-pulse may be output to remove or reduce blinking of a light output unit 110 rather than for the purpose of iris recognition.

In operation 610, the image sensor 125 may transmit a first pulse generation signal to the light output unit 110. The light output unit 110 may output an infrared first pulse. The first pulse may be ended before readout of the image sensor 125 is started.

In operation 620, the image sensor 125 may transmit a second pulse generation signal to the light output unit 110. The light output unit 110 may output an infrared second pulse. The second pulse may be output in a state where readout of the image sensor 125 is in progress and may be ended before readout of a last row is started.

In operation 630, the image sensor 125 may transmit a sub-pulse generation signal to the light output unit 110. The light output unit 110 may output at least one or more sub-pulses. In an embodiment, the sub-pulse may be output after the readout of the image sensor 125 is ended and may be ended before a next first pulse is started.

According to an embodiment, the sub-pulse may be output after the readout of the image sensor 125 is ended (or after an exposure of a previous frame is ended) and may be ended before exposure for collecting image data of a next frame.

According to various embodiments, to correspond to set frame per second, operations 610 to 630 may be repeated. For example, the image sensor 125 may sequentially transmit the first pulse generation signal, the second pulse generation signal, and the sub-pulse generation signal to the light output unit 110. The light output unit 110 may sequentially output the first pulse, the second pulse, and the sub-pulse. The image sensor 125 may read out image data recorded through the first pulse and the second pulse to collect frame data. The collected data may be used for user authentication. The sub-pulse may fail to have an influence on an optical/electrical conversion effect of the image sensor 125.

According to various embodiments, in FIG. 6, an embodiment is exemplified as the light output unit 110 operates by the control signal of the image sensor 125. However, embodiments are not limited thereto. For example, the light output unit 110 may be directly controlled by a control signal generated by a processor 105 in FIG. 2.

An object recognition method performed in an electronic device including a light output unit and an image sensor according to various embodiments may include starting, by the image sensor, an exposure, outputting, by the light output unit, a light of a first pulse based on a time when readout of the image sensor is started, and outputting, by the light output unit, a light of a second pulse based on a time when the readout of the image sensor is ended.

According to various embodiments, the starting of the exposure may include performing a shutter operation for a previous frame for a first row of the image sensor and starting an exposure for the first row.

According to various embodiments, the outputting of the light of the first pulse may include ending the first pulse before the time when the readout of the image sensor is started.

According to various embodiments, the outputting of the light of the second pulse may include ending the second pulse before readout for a last row of the image sensor is started.

According to various embodiments, the outputting of the light of the second pulse may include outputting the second pulse having the same duration as a duration of the first pulse.

According to various embodiments, the object recognition method may further include outputting a light of at least one sub-pulse of a wavelength different from the first pulse or the second pulse.

Figure 7:
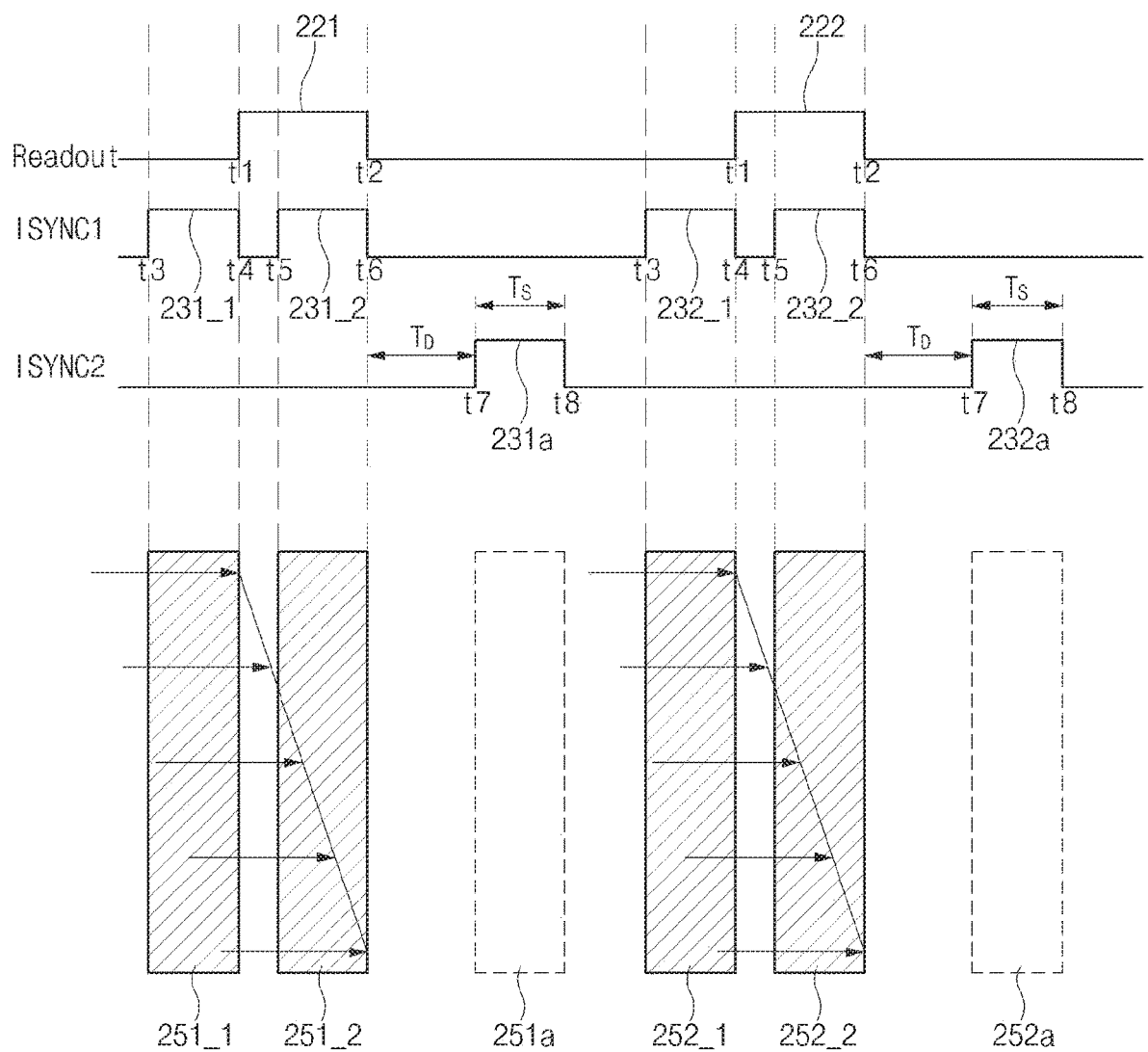
FIG. 7 is a timing diagram illustrating an output of a sub-pulse according to various embodiments.

FIG. 7 is a timing diagram illustrating an output of a sub-pulse according to various embodiments. FIG. 7 is illustrative, and it is not limited thereto.

Referring to FIG. 7, an image sensor 125 of an electronic device (e.g., an electronic device 101 of FIG. 1 or an electronic device 101 of FIG. 2) may output first pulses 251_1 and 252_1 and second pulses 251_2 and 252_2 by a first control signal ISYNC1. The first pulses 251_1 and 252_1 may be output by, for example, first pulse generation signals 231_1 and 232_1. The second pulses 251_2 and 252_2 may be output by, for example, second pulse generation signals 231_2 and 232_2. Output timings of the first pulse 251_1 and the second pulse 251_1 may be determined in connection with readout times $T_R$ 221 and 222.

According to various embodiments, the image sensor 125 may output sub-pulses 251a and 252a by a second control signal ISYNC2. The sub-pulses 251a and 252a may be output by sub-pulse generation signals 231a and 232a.

According to various embodiments, the sub-pulses 251a and 252a may be output between the second pulse 251_2 of a previous frame and the first pulse 251_1 of a next frame. For example, the sub-pulse 251a may be output at a time difference $T_D$ with the second pulse 251_2 of the previous frame. The sub-pulses 251a and 252a may be ended before an exposure for collecting image data of a next frame.

According to various embodiments, a processor 105 may change the time delay $T_D$ (or a start time t7) or a duration Ts (or a difference between an end time t8 and the start time t7) based on an environment around the electronic device 101 a characteristic of a light output unit 110, or the like.

Figure 8:
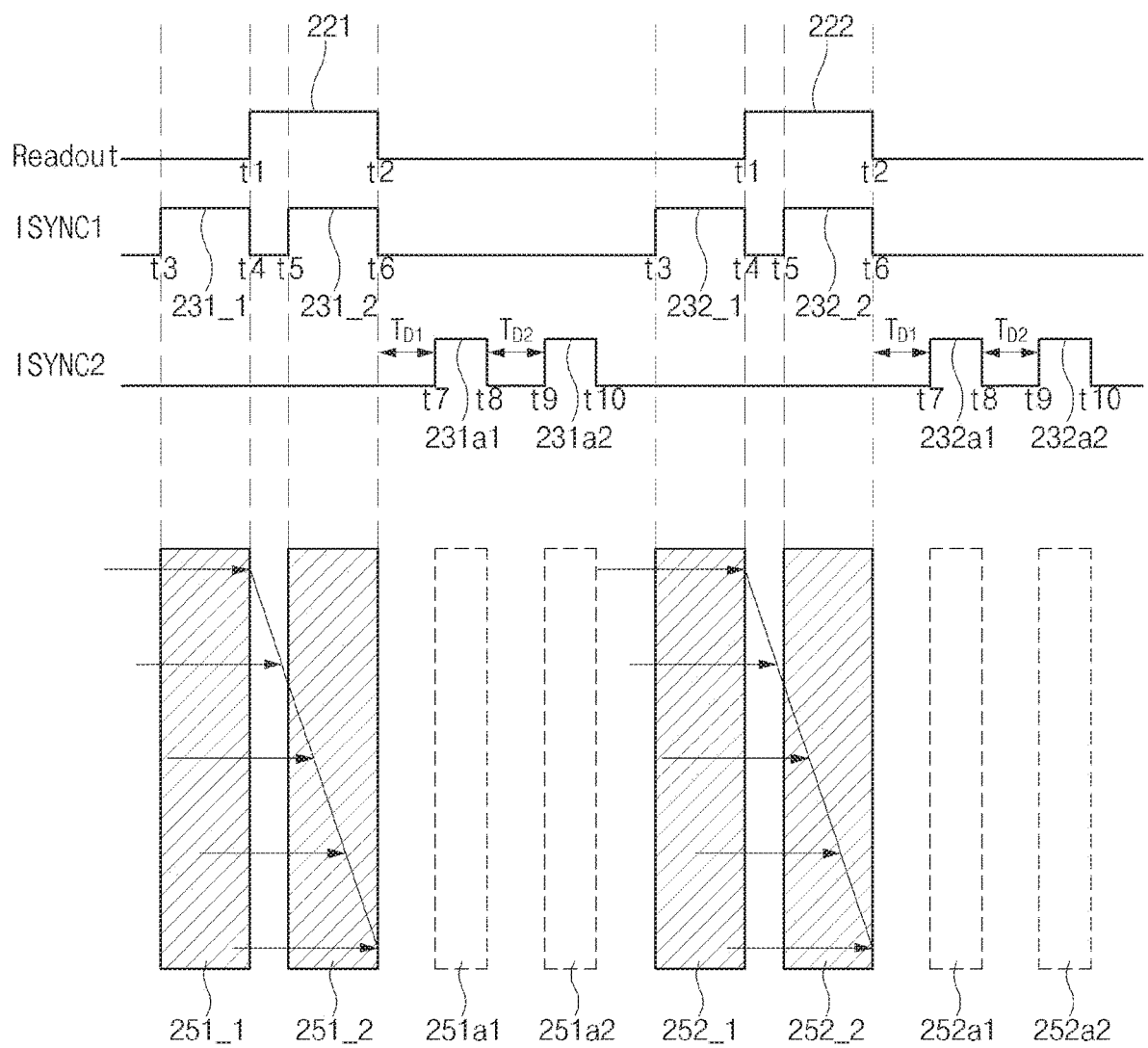
FIG. 8 is a timing diagram illustrating outputs of a plurality of sub-pulses according to various embodiments.

FIG. 8 is a timing diagram illustrating outputs of a plurality of sub-pulses according to various embodiments. FIG. 8 is illustrative, and it is not limited thereto.

Referring to FIG. 8, an image sensor 125 of an electronic device (e.g., an electronic device 101 of FIG. 1 or an electronic device 101 of FIG. 2) may output first pulses 251_1 and 252_1 and second pulses 251_2 and 252_2 by a first control signal ISYNC1. The first pulses 251_1 and 252_1 may be output by first pulse generation signals 231_1 and 232_1. The second pulses 251_2 and 252_2 may be output by second pulse generation signals 231_2 and 232_2. Output timings of the first pulse 251_1 and the second pulse 251_1 may be determined in connection with, for example, readout times $T_R$ 221 and 222.

According to various embodiments, the image sensor 125 may output first sub-pulses 251a1 and 252a1 and second sub-pulses 251a2 and 252a2 by a second control signal ISYNC2. The first sub-pulses 251a1 and 252a1 may be output by first sub-pulse generation signals 231a1 and 232a1. The second sub-pulses 251a2 and 252a2 may be output by second sub-pulse generation signals 231a2 and 232a2.

According to various embodiments, the first sub-pulse generation signals 231a1 and 232a1 may have the same duration (e.g., (t8-t7)=(t10-t9)). The duration ((t8-t7) or (t10-t9)) may vary according to an environment around the electronic device 101, a characteristic of a light output unit 110, or the like.

According to various embodiments, the first sub-pulse 251a1 may be output at a time difference $T_{D1}$ with the second sub-pulse 251_2 of a previous frame. The second sub-pulse 251a2 may be output at a time difference $T_{D2}$ with the first sub-pulse 251a1. $T_{D1}$ and $T_{D2}$ may vary according to an environment around the electronic device 101, a characteristic of the light output unit 110, or the like.

An electronic device 901 in a network environment 900 according to various embodiments of the present disclosure will be described with reference to FIG. 9. The electronic device 901 may include a bus 910, a processor 920, a memory 930, an input/output interface 950, a display 960, and a communication interface 970. In various embodiments of the present disclosure, at least one of the foregoing elements may be omitted or another element may be added to the electronic device 901. The bus 910 may include a circuit for connecting the above-mentioned elements 910 to 970 to each other and transferring communications (e.g., control messages and/or data) among the above-mentioned elements. The processor 920 may include at least one of a central processing unit (CPU), an application processor (AP), or a communication processor (CP). The processor 920 may perform, for example, data processing or an operation related to communication and/or control of at least one of the other elements of the electronic device 901.

The memory 930 may include a volatile memory and/or a nonvolatile memory. The memory 930 may store instructions or data related to at least one of the other elements of the electronic device 901. According to an embodiment of the present disclosure, the memory 930 may store software and/or a program 940. The program 940 may include, for example, a kernel 941, a middleware 943, an application programming interface (API) 945, and/or an application program (or an application) 947. At least a portion of the kernel 941, the middleware 943, or the API 945 may be referred to as an operating system (OS). The kernel 941 may control or manage system resources (e.g., the bus 910, the processor 920, the memory 930, or the like) used to perform operations or functions of other programs (e.g., the middleware 943, the API 945, or the application program 947). Furthermore, the kernel 941 may provide an interface for allowing the middleware 943, the API 945, or the application program 947 to access individual elements of the electronic device 901 in order to control or manage the system resources.

The middleware 943 may serve as an intermediary so that the API 945 or the application program 947 communicates and exchanges data with the kernel 941. Furthermore, the middleware 943 may handle one or more task requests received from the application program 947 according to a priority order. For example, the middleware 943 may assign at least one application program 947 a priority for using the system resources (e.g., the bus 910, the processor 920, the memory 930, or the like) of the electronic device 901. For example, the middleware 943 may handle the one or more task requests according to the priority assigned to the at least one application, thereby performing scheduling or load balancing with respect to the one or more task requests. The API 945, which is an interface for allowing the application 947 to control a function provided by the kernel 941 or the middleware 943, may include, for example, at least one interface or function (e.g., instructions) for file control, window control, image processing, character control, or the like. The input/output interface 950 may serve to transfer an instruction or data input from a user or another external device to (an)other element(s) of the electronic device 901. Furthermore, the input/output interface 950 may output instructions or data received from (an)other element(s) of the electronic device 901 to the user or another external device.

The display 960 may include, for example, a liquid crystal display (LCD), a light-emitting diode (LED) display, an organic light-emitting diode (OLED) display, a microelectromechanical systems (MEMS) display, or an electronic paper display. The display 960 may present various content (e.g., a text, an image, a video, an icon, a symbol, or the like) to the user. The display 960 may include a touch screen, and may receive a touch, gesture, proximity or hovering input from an electronic pen or a part of a body of the user. The communication interface 970 may set communications between the electronic device 901 and an external device (e.g., a first external electronic device 902, a second external electronic device 904, or a server 906). For example, the communication interface 970 may be connected to a network 962 via wireless communications or wired communications so as to communicate with the external device (e.g., the second external electronic device 904 or the server 906).

The wireless communication may include at least one of, for example, LTE (long-term evolution), LTE-A (LTE Advance), CDMA (Code Division Multiple Access), WCDMA (Wideband CDMA), UMTS (Universal Mobile Telecommunications System), WiBro (Wireless Broadband), or GSM (Global System for Mobile Communications), or the like, as cellular communication protocol. Furthermore, the wireless communication may include, for example, a local area network 964. The local area network 964 may include at least one of a wireless fidelity (Wi-Fi), a near field communication (NFC), or a global navigation satellite system (GNSS), or the like. The GNSS may include at least one of a global positioning system (GPS), a global navigation satellite system (Glonass), Beidou Navigation Satellite System (hereinafter referred to as "Beidou"), the European global satellite-based navigation system (Galileo), or the like. In this specification, "GPS" and "GNSS" may be interchangeably used. The wired communication may include at least one of, for example, a universal serial bus (USB), a high definition multimedia interface (HDMI), a recommended standard-232 (RS-232), a plain old telephone service (POTS), or the like. The network 962 may include at least one of telecommunications networks, for example, a computer network (e.g., LAN or WAN), an Internet, or a telephone network.

The types of the first external electronic device 902 and the second external electronic device 904 may be the same as or different from the type of the electronic device 901. According to an embodiment of the present disclosure, the server 906 may include a group of one or more servers. A portion or all of operations performed in the electronic device 901 may be performed in one or more other electronic devices (e.g., the first electronic device 902, the second external electronic device 904, or the server 906). When the electronic device 901 should perform a certain function or service automatically or in response to a request, the electronic device 901 may request at least a portion of functions related to the function or service from another device (e.g., the first electronic device 902, the second external electronic device 904, or the server 906) instead of or in addition to performing the function or service for itself. The other electronic device (e.g., the first electronic device 902, the second external electronic device 904, or the server 906) may perform the requested function or additional function, and may transfer a result of the performance to the electronic device 901. The electronic device 901 may use a received result itself or additionally process the received result to provide the requested function or service. To this end, for example, a cloud computing technology, a distributed computing technology, or a client-server computing technology may be used.

Figure 10:
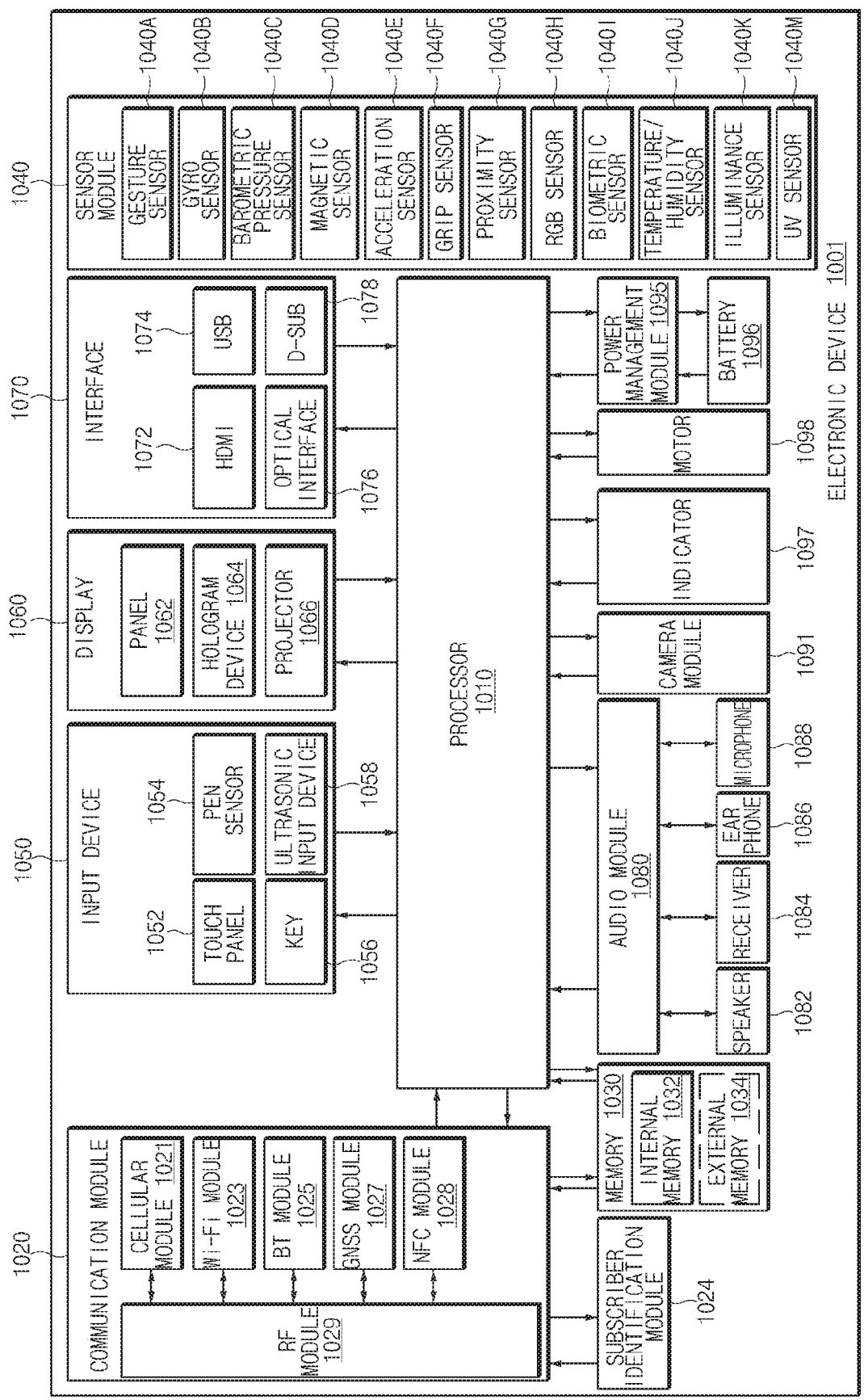
FIG. 10 is a block diagram of an electronic device according to various embodiments.

FIG. 10 is a block diagram illustrating an electronic device according to an embodiment of the present disclosure.

Figure 9:
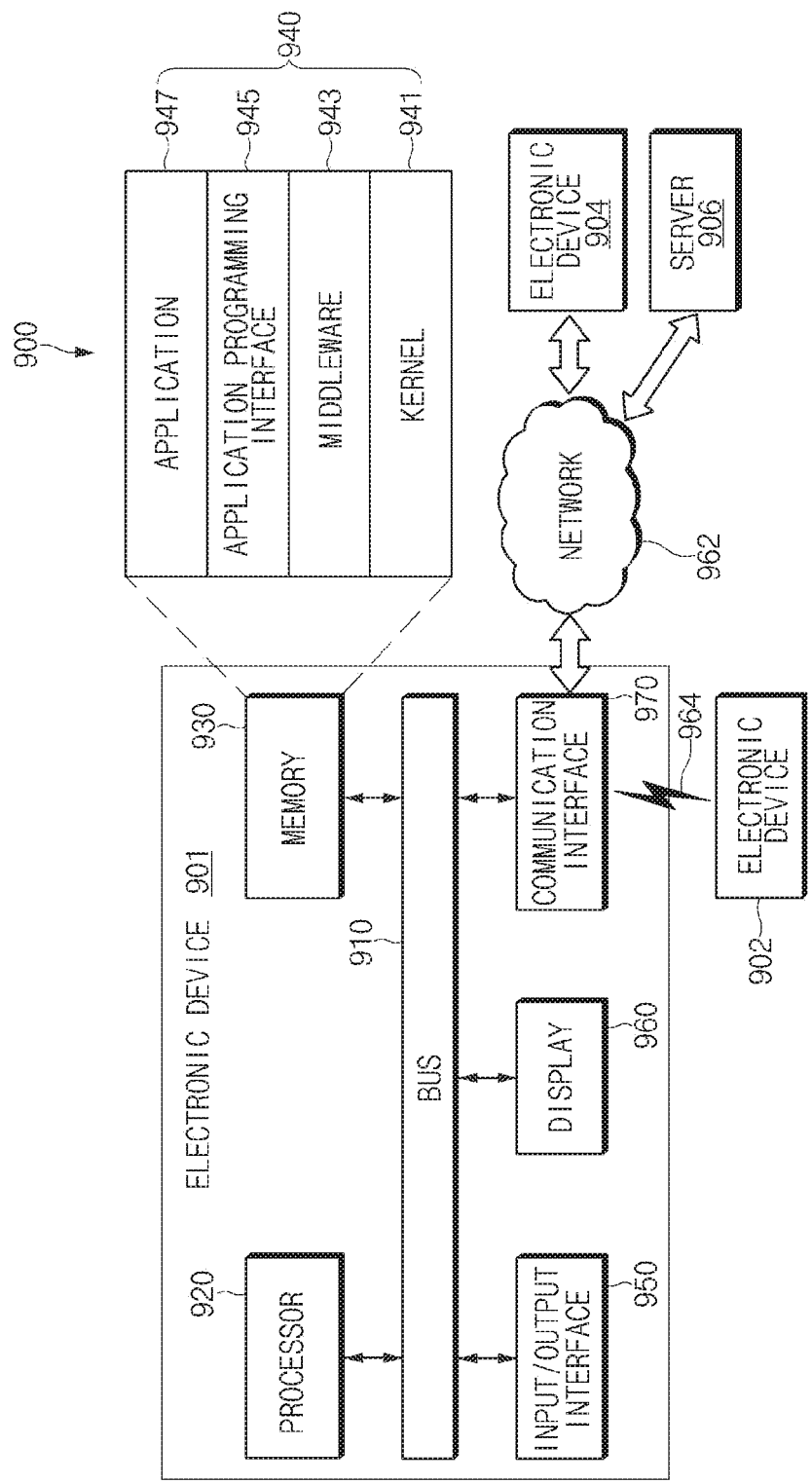
FIG. 9 illustrates an electronic device in a network environment.

Referring to FIG. 10, an electronic device 1001 may include, for example, a part or the entirety of the electronic device 901 illustrated in FIG. 9. The electronic device 1001 may include at least one processor (e.g., AP) 1010, a communication module 1020, a subscriber identification module (SIM) 1024, a memory 1030, a sensor module 1040, an input device 1050, a display 1060, an interface 1070, an audio module 1080, a camera module 1091, a power management module 1095, a battery 1096, an indicator 1097, and a motor 1098. The processor 1010 may run an operating system or an application program so as to control a plurality of hardware or software elements connected to the processor 1010, and may process various data and perform operations. The processor 1010 may be implemented with, for example, a system on chip (SoC). According to an embodiment of the present disclosure, the processor 1010 may further include a graphic processing unit (GPU) and/or an image signal processor. The processor 1010 may include at least a portion (e.g., a cellular module 1021) of the elements illustrated in FIG. 10. The processor 1010 may load, on a volatile memory, an instruction or data received from at least one of other elements (e.g., a nonvolatile memory) to process the instruction or data, and may store various data in a nonvolatile memory.

The communication module 1020 may be configured the same as or similar to the communication interface 970 of FIG. 9. The communication module 1020 may include a cellular module 1021, a Wi-Fi module 1023, a Bluetooth (BT) module 1025, a GNSS module 1027 (e.g., a GPS module, a Glonass module, a Beidou module, or a Galileo module) and a near field communication (NFC) module 1028. The cellular module 1021 may provide voice communication, video communication, a message service, an Internet service or the like through a communication network. According to an embodiment, the cellular module 1021 may perform discrimination and authentication of the electronic device 1001 within a communication network using the subscriber identification module 1024 (e.g., a SIM card), for example. According to an embodiment, the cellular module 1021 may perform at least a portion of functions that the processor 1010 provides. According to an embodiment, the cellular module 1021 may include a communication processor (CP). Each of the Wi-Fi module 1023, the BT module 1025, the GNSS module 1027, and the NFC module 1028 may include a processor for processing data exchanged through a corresponding module, for example. According to an embodiment, at least a part (e.g., two or more elements) of the cellular module 1021, the Wi-Fi module 1023, the BT module 1025, the GNSS module 1027, or the NFC module 1028 may be included within one Integrated Circuit (IC) or an IC package. According to another embodiment, at least one of the cellular module 1021, the Wi-Fi module 1023, the BT module 1025, the GNSS module 1027, or the NFC module 1028 may transmit and receive an RF signal through a separate RF module. The subscriber identification module 1024 may include, for example, a card and/or embedded SIM that includes a subscriber identification module and may include unique identify information (e.g., integrated circuit card identifier (ICCID)) or subscriber information (e.g., international mobile subscriber identity (IMSI)).

The memory 1030 (e.g., the memory 930) may include, for example, an internal memory 1032 or an external memory 1034. The internal memory 1032 may include at least one of a volatile memory (e.g., a dynamic RAM (DRAM), a static RAM (SRAM), a synchronous dynamic RAM (SDRAM), or the like), a nonvolatile memory (e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, a NOR flash memory, or the like)), a hard drive, or a solid state drive (SSD). The external memory 1034 may include a flash drive such as a compact flash (CF), a secure digital (SD), a Micro-SD, a Mini-SD, an extreme digital (xD), a MultiMediaCard (MMC), a memory stick, or the like. The external memory 1034 may be operatively and/or physically connected to the electronic device 1001 through various interfaces.

The sensor module 1040 may, for example, measure physical quantity or detect an operation state of the electronic device 1001 so as to convert measured or detected information into an electrical signal. The sensor module 1040 may include, for example, at least one of a gesture sensor 1040A, a gyro sensor 1040B, a barometric pressure sensor 1040C, a magnetic sensor 1040D, an acceleration sensor 1040E, a grip sensor 1040F, a proximity sensor 1040G, a color sensor 1040H (e.g., a red/green/blue (RGB) sensor), a biometric sensor 1040I, a temperature/humidity sensor 1040J, an illumination sensor 1040K, or an ultraviolet (UV) sensor 1040M. Additionally or alternatively, the sensor module 1040 may include, for example, an olfactory sensor (E-nose sensor), an electromyography (EMG) sensor, an electroencephalogram (EEG) sensor, an electrocardiogram (ECG) sensor, an infrared (IR) sensor, an iris recognition sensor, and/or a fingerprint sensor. The sensor module 1040 may further include a control circuit for controlling at least one sensor included therein. In some various embodiments of the present disclosure, the electronic device 1001 may further include a processor configured to control the sensor module 1040 as a part of the processor 1010 or separately, so that the sensor module 1040 is controlled while the processor 1010 is in a sleep state.

The input device 1050 may include, for example, a touch panel 1052, a (digital) pen sensor 1054, a key 1056, or an ultrasonic input device 1058. The touch panel 1052 may employ at least one of capacitive, resistive, infrared, and ultraviolet sensing methods. The touch panel 1052 may further include a control circuit. The touch panel 1052 may further include a tactile layer so as to provide a haptic feedback to a user. The (digital) pen sensor 1054 may include, for example, a sheet for recognition which is a part of a touch panel or is separate. The key 1056 may include, for example, a physical button, an optical button, or a keypad. The ultrasonic input device 1058 may sense ultrasonic waves generated by an input tool through a microphone 1088 so as to identify data corresponding to the ultrasonic waves sensed.

The display 1060 (e.g., the display 960) may include a panel 1062, a hologram device 1064, or a projector 1066. The panel 1062 may have a configuration that is the same as or similar to that of the display 960 of FIG. 9. The panel 1062 may be, for example, flexible, transparent, or wearable. The panel 1062 and the touch panel 1052 may be integrated into a single module. The hologram device 1064 may display a stereoscopic image in a space using a light interference phenomenon. The projector 1066 may project light onto a screen so as to display an image. The screen may be disposed in the inside or the outside of the electronic device 1001. According to an embodiment of the present disclosure, the display 1060 may further include a control circuit for controlling the panel 1062, the hologram device 1064, or the projector 1066. The interface 1070 may include, for example, an HDMI 1072, a USB 1074, an optical interface 1076, or a D-subminiature (D-sub) 1078. The interface 1070, for example, may be included in the communication interface 970 illustrated in FIG. 9. Additionally or alternatively, the interface 1070 may include, for example, a mobile high-definition link (MHL) interface, an SD card/multimedia card (MMC) interface, or an infrared data association (IrDA) interface.

The audio module 1080 may convert, for example, a sound into an electrical signal or vice versa. At least a portion of elements of the audio module 1080 may be included in the input/output interface 950 illustrated in FIG. 9. The audio module 1080 may process sound information input or output through a speaker 1082, a receiver 1084, an earphone 1086, or the microphone 1088. The camera module 1091 is, for example, a device for shooting a still image or a video. According to an embodiment of the present disclosure, the camera module 1091 may include at least one image sensor (e.g., a front sensor or a rear sensor), a lens, an image signal processor (ISP), or a flash (e.g., an LED or a xenon lamp). The power management module 1095 may manage power of the electronic device 1001. According to an embodiment of the present disclosure, the power management module 1095 may include a power management integrated circuit (PMIC), a charger integrated circuit (IC), or a battery or gauge. The PMIC may employ a wired and/or wireless charging method. The wireless charging method may include, for example, a magnetic resonance method, a magnetic induction method, an electromagnetic method, or the like. An additional circuit for wireless charging, such as a coil loop, a resonant circuit, a rectifier, or the like, may be further included. The battery gauge may measure, for example, a remaining capacity of the battery 1096 and a voltage, current or temperature thereof while the battery is charged. The battery 1096 may include, for example, a rechargeable battery and/or a solar battery.

The indicator 1097 may display a specific state of the electronic device 1001 or a part thereof (e.g., the processor 1010), such as a booting state, a message state, a charging state, or the like. The motor 1098 may convert an electrical signal into a mechanical vibration, and may generate a vibration or haptic effect. Although not illustrated, a processing device (e.g., a GPU) for supporting a mobile TV may be included in the electronic device 1001. The processing device for supporting a mobile TV may process media data according to the standards of digital multimedia broadcasting (DMB), digital video broadcasting (DVB), MediaFLO™, or the like. Each of the elements described herein may be configured with one or more components, and the names of the elements may be changed according to the type of an electronic device. In various embodiments of the present disclosure, an electronic device may include at least one of the elements described herein, and some elements may be omitted or other additional elements may be added. Furthermore, some of the elements of the electronic device may be combined with each other so as to form one entity, so that the functions of the elements may be performed in the same manner as before the combination.

According to various embodiments, an electronic device includes a housing including a first surface, a display exposed through a first portion of the first surface, a first light emitting source exposed through a second portion of the first surface, an imaging sensor circuit that is exposed through a third portion of the first surface and is electrically connected with the first light emitting source, and a processor that is disposed in the housing and is electrically connected with the imaging sensor circuit, wherein the imaging sensor circuit is configured to receive an enable signal from the processor, perform readout from a first time t1 to a second time t2 depending on the reception of the enable signal, and provide a first synchronization signal to the first light emitting source from a third time t3 to a fourth time t4 and from a fifth time t5 to a sixth time t6, and wherein the first to sixth times t1 to t6 have a relationship of the third time t3<the fourth time t4≤the first time t1<the fifth time t5<the sixth time t6≤the second time t2.

According to various embodiments, the first light emitting source is configured to provide an infrared (IR) light.

According to various embodiments, the electronic device further includes a second light emitting source exposed through a fourth portion of the first surface, wherein the second light emitting source is configured to provide a visible light. The imaging sensor circuit is configured to provide a second synchronization signal to the second light emitting source from a seventh time t7 to an eighth time t8, and the second time t2, the seventh time t7, and the eighth time t8 have a relationship of the second time t2<the seventh time t7<the eighth time t8. The imaging sensor circuit ends the second synchronization signal before an exposure of a next frame is started.

According to various embodiments, the processor may set the light provided from the first light emitting source to flow into each pixel constituting the imaging sensor circuit for the same time. The processor may set an exposure time of each pixel included in the imaging sensor circuit to be equal to a read out time of all pixels included in the imaging sensor circuit. The processor may set the difference between the first time t1 and the fourth time t4 to be equal to the difference between the second time t2 and the sixth time t6.

According to various embodiments, an electronic device includes a memory, a processor, an image sensor configured to convert an external light into electronic image data, and a light output unit configured to output a light of a specified wavelength, wherein the image sensor is configured to transmit a first control signal to the light output unit such that the light output unit outputs a light of a first pulse and a second pulse based on a time when readout is started or a time when the readout is ended According to various embodiments, the image sensor generates the first control signal such that the first pulse is started, after readout of a previous frame is ended.

According to various embodiments, the image sensor generates the first control signal such that the first pulse is started, after a shutter operation of a previous frame is completed.

According to various embodiments, the image sensor generates the first control signal such that the first pulse is ended, before the time when the readout is started or at the same time as the time when the readout is started.

According to various embodiments, the image sensor generates the first control signal such that the second pulse is started, after readout for a first row of the image sensor is ended.

According to various embodiments, the image sensor generates the first control signal such that the second pulse is ended, before readout for a last row of the image sensor is started or at the same time as the time when the readout for the last row is started.

According to various embodiments, the first pulse and the second pulse include light of an infrared wavelength, and the image sensor collects image data using light reflected by the first pulse and the second pulse on an iris of a user.

According to various embodiments, the first pulse and the second pulse have the same duration.

According to various embodiments, the processor may determine durations or intensities of the first and second pulses based on sensing information around the electronic device, an operating characteristic of the image sensor, or an operating characteristic of the light output unit.

According to various embodiments, the image sensor transmits a second control signal to the light output unit to output a light of at least one sub-pulse output after the second pulse is output The at least one sub-pulse may include light having a visible wavelength. The at least one sub-pulse is started after an exposure of a first frame is ended and is ended before an exposure of a second frame is started.

According to various embodiments, the first control signal and the second control signal may be transmitted from the image sensor to the light output unit through different physically separated channels.

Figure 11:
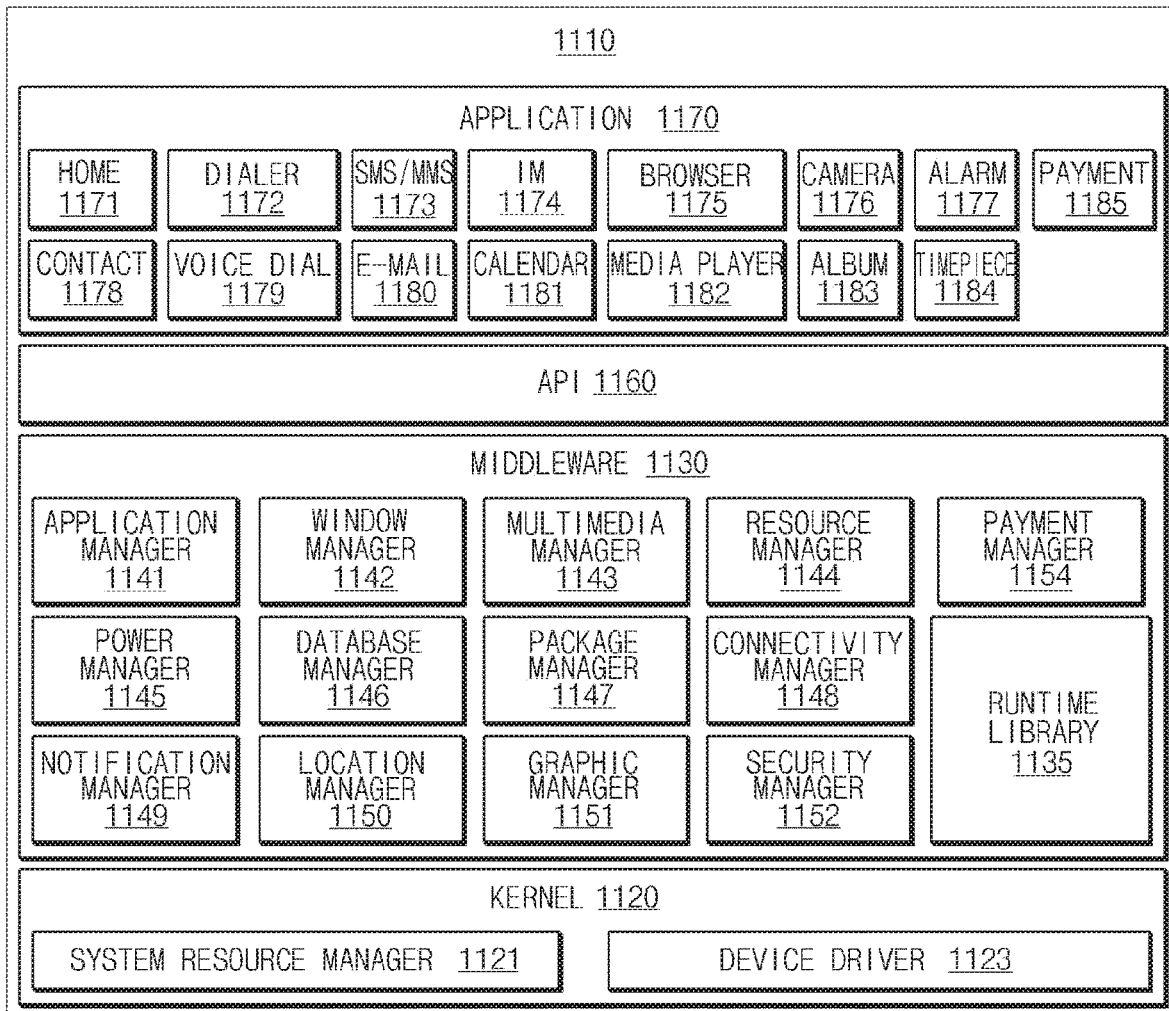
FIG. 11 is a block diagram of a program module according to various embodiments.

FIG. 11 is a block diagram illustrating a program module according to an embodiment of the present disclosure. A program module 1110 (e.g., the program 940) may include an operating system (OS) for controlling a resource related to an electronic device (e.g., the electronic device 901) and/or various applications (e.g., the application program 947) running on the OS. The operating system may be, for example, Android™, iOS, Windows™, Symbian™, Tizen™, Bada™ or the like. Referring to FIG. 11, the program module 1110 may include a kernel 1120, a middleware 1130, an API 1160, and/or an application 1170. At least a part of the program module 1110 may be preloaded on an electronic device or may be downloaded from an external electronic device (e.g., the first electronic device 902, the second external electronic device 904, or the server 906).

The kernel 1120 (e.g., the kernel 941) may include, for example, a system resource manager 1121 or a device driver 1123. The system resource manager 1121 may perform control, allocation, or retrieval of a system resource. According to an embodiment of the present disclosure, the system resource manager 1121 may include a process management unit, a memory management unit, a file system management unit, or the like. The device driver 1123 may include, for example, a display driver, a camera driver, a Bluetooth driver, a shared memory driver, a USB driver, a keypad driver, a Wi-Fi driver, an audio driver, or an inter-process communication (IPC) driver. The middleware 1130, for example, may provide a function that the applications 1170 require in common, or may provide various functions to the applications 1170 through the API 1160 so that the applications 1170 may efficiently use limited system resources in the electronic device. According to an embodiment of the present disclosure, the middleware 1130 (e.g., the middleware 943) may include at least one of a runtime library 1135, an application manager 1141, a window manager 1142, a multimedia manager 1143, a resource manager 1144, a power manager 1145, a database manager 1146, a package manager 1147, a connectivity manager 1148, a notification manager 1149, a location manager 1150, a graphic manager 1151, and a security manager 1152.

The runtime library 1135 may include, for example, a library module that a complier uses to add a new function through a programming language while the application 1170 is running. The runtime library 1135 may perform a function for input/output management, memory management, or an arithmetic function. The application manager 1141 may mange, for example, a life cycle of at least one of the applications 1170. The window manager 1142 may manage a GUI resource used in a screen. The multimedia manager 1143 may recognize a format required for playing various media files and may encode or decode a media file using a codec matched to the format. The resource manager 1144 may manage a resource such as a source code, a memory, or a storage space of at least one of the applications 1170. The power manager 1145, for example, may operate together with a basic input/output system (BIOS) to manage a battery or power and may provide power information required for operating the electronic device. The database manager 1146 may generate, search, or modify a database to be used in at least one of the applications 1170. The package manager 1147 may manage installation or update of an application distributed in a package file format.

The connectivity manger 1148 may manage wireless connection of Wi-Fi, Bluetooth, or the like. The notification manager 1149 may display or notify an event such as message arrival, appointments, and proximity alerts in such a manner as not to disturb a user. The location manager 1150 may manage location information of the electronic device. The graphic manager 1151 may manage a graphic effect to be provided to a user or a user interface related thereto. The security manager 1152 may provide various security functions required for system security or user authentication. According to an embodiment of the present disclosure, in the case in which an electronic device (e.g., the electronic device 901) includes a phone function, the middleware 1130 may further include a telephony manager for managing a voice or video call function of the electronic device. The middleware 1130 may include a middleware module for forming a combination of various functions of the above-mentioned elements. The middleware 1130 may provide a module specialized for each type of an operating system to provide differentiated functions. Furthermore, the middleware 1130 may delete a part of existing elements or may add new elements dynamically. The API 1160 (e.g., the API 945) which is, for example, a set of API programming functions may be provided in different configurations according to an operating system. For example, in the case of Android or iOS, one API set may be provided for each platform, and, in the case of Tizen, at least two API sets may be provided for each platform.

The application 1170 (e.g., the application program 947), for example, may include at least one application capable of performing functions such as a home 1171, a dialer 1172, an SMS/MMS 1173, an instant message (IM) 1174, a browser 1175, a camera 1176, an alarm 1177, a contact 1178, a voice dial 1179, an e-mail 1180, a calendar 1181, a media player 1182, an album 1183, a clock 1184, health care (e.g., measure an exercise amount or blood sugar), or environmental information provision (e.g., provide air pressure, humidity, or temperature information). According to an embodiment of the present disclosure, the application 1170 may include an information exchange application for supporting information exchange between the electronic device (e.g., the electronic device 901) and an external electronic device (e.g., the first electronic device 902 or the second external electronic device 904). The information exchange application may include, for example, a notification relay application for relaying specific information to the external electronic device or a device management application for managing the external electronic device. For example, the notification relay application may have a function for relaying, to an external electronic device (e.g., the first electronic device 902 or the second external electronic device 904), notification information generated in another application (e.g., an SMS/MMS application, an e-mail application, a health care application, an environmental information application, or the like) of the electronic device. Furthermore, the notification relay application may receive notification information from the external electronic device and may provide the received notification information to the user. The device management application, for example, may manage (e.g., install, delete, or update) at least one function (e.g., turn-on/turn off of the external electronic device itself (or some elements) or the brightness (or resolution) adjustment of a display) of the external electronic device (e.g., the first electronic device 902 or the second external electronic device 904) communicating with the electronic device, an application running in the external electronic device, or a service (e.g., a call service, a message service, or the like) provided from the external electronic device. According to an embodiment of the present disclosure, the application 1170 may include a specified application (e.g., a healthcare application of a mobile medical device) according to an attribute of the external electronic device (e.g., the first electronic device 902 or the second external electronic device 904). The application 1170 may include an application received from an external electronic device (e.g., the first electronic device 902 or the second external electronic device 904). The application 1170 may include a preloaded application or a third-party application downloadable from a server. The names of the elements of the program module 1110 illustrated may vary with the type of an operating system. According to various embodiments of the present disclosure, at least a part of the program module 1110 may be implemented with software, firmware, hardware, or a combination thereof. At least a part of the program module 1110, for example, may be implemented (e.g., executed) by a processor (e.g., the processor 1010). At least a part of the program module 1110 may include, for example, a module, a program, a routine, sets of instructions, or a process for performing at least one function.

The term "module" used herein may represent, for example, a unit including one of hardware, software and firmware or a combination thereof. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific integrated circuit (ASIC) chip, a field-programmable gate array (FPGA), and a programmable-logic device for performing some operations, which are known or will be developed. At least a part of devices (e.g., modules or functions thereof) or methods (e.g., operations) according to various embodiments of the present disclosure may be implemented as instructions stored in a computer-readable storage medium in the form of a program module. In the case where the instructions are performed by a processor (e.g., the processor 920), the processor may perform functions corresponding to the instructions. The computer-readable storage medium may be, for example, the memory 930. A computer-readable recording medium may include a hard disk, a floppy disk, a magnetic medium (e.g., a magnetic tape), an optical medium (e.g., CD-ROM, digital versatile disc (DVD)), a magneto-optical medium (e.g., a floptical disk), or a hardware device (e.g., a ROM, a RAM, a flash memory, or the like). The program instructions may include machine language codes generated by compilers and high-level language codes that can be executed by computers using interpreters. The above-mentioned hardware device may be configured to be operated as one or more software modules for performing operations of various embodiments of the present disclosure and vice versa. A module or a program module according to various embodiments of the present disclosure may include at least one of the above-mentioned elements, or some elements may be omitted or other additional elements may be added. Operations performed by the module, the program module or other elements according to various embodiments of the present disclosure may be performed in a sequential, parallel, iterative or heuristic way. Furthermore, some operations may be performed in another order or may be omitted, or other operations may be added.

What is claimed is:

1. An electronic device, comprising:
a housing including a first surface;
a display exposed through a first portion of the first surface;
a first light emitting source exposed through a second portion of the first surface;
an imaging sensor circuit that is exposed through a third portion of the first surface and is electrically connected with the first light emitting source; and
a processor that is disposed in the housing and is electrically connected with the imaging sensor circuit,
wherein the imaging sensor circuit is configured to:
    receive an enable signal from the processor;
    perform readout from a first time t1 to a second time t2 depending on the reception of the enable signal; and
    provide a first synchronization signal to the first light emitting source from a third time t3 to a fourth time t4 and from a fifth time t5 to a sixth time t6, and
wherein the first to sixth times t1 to t6 have a relationship of the third time t3<the fourth time t4≤the first time t1<the fifth time t5<the sixth time t6≤the second time t2.

2. The electronic device of claim 1, wherein the first light emitting source is configured to provide an infrared (IR) light.

3. The electronic device of claim 2, further comprising:
a second light emitting source exposed through a fourth portion of the first surface,
wherein the second light emitting source is configured to provide a visible light.

4. The electronic device of claim 3,
wherein the imaging sensor circuit is configured to provide a second synchronization signal to the second light emitting source from a seventh time t7 to an eighth time t8, and
wherein the second time t2, the seventh time t7, and the eighth time t8 have a relationship of the second time t2<the seventh time t7<the eighth time t8.

5. The electronic device of claim 4, wherein the imaging sensor circuit ends the second synchronization signal before an exposure of a next frame is started.

6. An electronic device, comprising:
a memory;
a processor;
an image sensor configured to convert an external light into electronic image data; and a light output unit configured to output a light of a specified wavelength, wherein the image sensor is configured to:
  transmit a first control signal to the light output unit such that the light output unit outputs a light of a first pulse and a second pulse based on a time when readout is started or a time when the readout is ended, and wherein the second pulse is ended before a readout for a last row of the image sensor is started or at the same time as the time when the readout for the last row is started.

7. The electronic device of claim 6, wherein the image sensor generates the first control signal such that the first pulse is started, after readout of a previous frame is ended.

8. The electronic device of claim 6, wherein the image sensor generates the first control signal such that the first pulse is started, after a shutter operation of a previous frame is completed.

9. The electronic device of claim 6, wherein the image sensor generates the first control signal such that the first pulse is ended, before the time when the readout is started or at the same time as the time when the readout is started.

10. The electronic device of claim 6, wherein the image sensor generates the first control signal such that the second pulse is started, after readout for a first row of the image sensor is ended.

11. The electronic device of claim 6, wherein the first pulse and the second pulse have the same duration.

12. The electronic device of claim 6, wherein the image sensor transmits a second control signal to the light output unit to output a light of at least one sub-pulse output after the second pulse is output.

13. The electronic device of claim 12, wherein the at least one sub-pulse is started after an exposure of a first frame is ended and is ended before an exposure of a second frame is started.

14. An object recognition method performed in an electronic device including a light output unit and an image sensor, the method comprising:
  starting, by the image sensor, an exposure;
  outputting, by the light output unit, a light of a first pulse based on a time when readout of the image sensor is started; and
  outputting, by the light output unit, a light of a second pulse based on a time when the readout of the image sensor is ended,
  wherein the second pulse is ended before a readout for a last row of the image sensor is started or at the same time as the time when the readout for the last row is started.

* * * * *